United States Patent
Son et al.

(10) Patent No.: US 10,666,079 B2
(45) Date of Patent: May 26, 2020

(54) POWER CONVERSION APPARATUS, METHOD FOR CONTROLLING THE SAME, AND VEHICLE INCLUDING THE SAME

(71) Applicants: Hyundai Motor Company, Seoul (KR); Kia Motors Corporation, Seoul (KR)

(72) Inventors: Gibong Son, Gyeonggi-do (KR); Hui-Sung Jang, Gyeonggi-do (KR); Hyun-Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 373 days.

(21) Appl. No.: 15/723,721

(22) Filed: Oct. 3, 2017

(65) Prior Publication Data

US 2018/0358832 A1    Dec. 13, 2018

(30) Foreign Application Priority Data

Jun. 9, 2017    (KR) .................. 10-2017-0072227

(51) Int. Cl.
*H02J 7/00*        (2006.01)
*B60L 8/00*        (2006.01)
(Continued)

(52) U.S. Cl.
CPC ............ *H02J 7/0072* (2013.01); *B60L 8/003* (2013.01); *B60L 53/20* (2019.02); *B60L 53/22* (2019.02);
(Continued)

(58) Field of Classification Search
None
See application file for complete search history.

(56) References Cited

U.S. PATENT DOCUMENTS

2012/0049792 A1* 3/2012 Crombez .............. H01M 10/44
320/109
2013/0342154 A1* 12/2013 Yamamoto .............. H02J 7/007
320/101
(Continued)

FOREIGN PATENT DOCUMENTS

EP        2752329 A1    7/2014

OTHER PUBLICATIONS

Extended European Search Report for European Patent Application No. 17196960, dated May 3, 2018, 6 pages.

*Primary Examiner* — Jared Fureman
*Assistant Examiner* — Joel Barnett
(74) *Attorney, Agent, or Firm* — Mintz Levin Cohn Ferris Glovsky and Popeo, P.C.; Peter F. Corless

(57) ABSTRACT

A power conversion apparatus, a method for controlling the same and a vehicle including the same is provided. The power conversion apparatus includes a first power conversion portion having a first end connected to a first battery and a second end selectively connected to at least one of a power-supply portion and a second battery, a second power conversion portion having a first end connected to the first battery and a second end connected to the second battery. The second power conversion portion is configured to provide power supplied from the first battery to the second battery. A switching portion is configured to connect any one of the power-supply portion and the second battery to the first power conversion portion.

19 Claims, 15 Drawing Sheets

(51) Int. Cl.
  *H02J 7/35*   (2006.01)
  *B60L 53/22*  (2019.01)
  *B60L 53/20*  (2019.01)
  *B60L 55/00*  (2019.01)
  *B60L 58/20*  (2019.01)
  *H02J 7/34*   (2006.01)
  *H02M 3/335*  (2006.01)
  *H02J 1/08*   (2006.01)

(52) U.S. Cl.
  CPC ............... *B60L 55/00* (2019.02); *B60L 58/20* (2019.02); *H02J 7/342* (2020.01); *H02J 7/35* (2013.01); *H02M 3/335* (2013.01); *H02J 1/08* (2013.01); *H02J 7/0068* (2013.01); *H02J 2207/20* (2020.01)

(56) References Cited

U.S. PATENT DOCUMENTS

| | | | |
|---|---|---|---|
| 2014/0159478 A1* | 6/2014 | Ang | B60L 1/00 307/9.1 |
| 2015/0175021 A1* | 6/2015 | Kim | B60L 11/1812 320/109 |
| 2015/0183328 A1* | 7/2015 | Kusch | B60L 58/26 320/109 |
| 2016/0185237 A1* | 6/2016 | Ha | B60L 1/00 318/139 |
| 2017/0085111 A1 | 3/2017 | Kim et al. | |

\* cited by examiner

POWER CONVERSION APPARATUS, METHOD FOR CONTROLLING THE SAME, AND VEHICLE INCLUDING THE SAME

CROSS-REFERENCE TO RELATED APPLICATION

This application claims the benefit of Korean Patent Application No. 10-2017-0072227, filed on Jun. 9, 2017 in the Korean Intellectual Property Office, the disclosure of which is incorporated herein by reference.

BACKGROUND

1. Field of the Disclosure

The present disclosure relates to power conversion control, and more particularly, to an apparatus and a method for controlling power conversion, and a vehicle including the same.

2. Description of the Related Art

Generally, vehicles may include, three-wheeled or four-wheeled vehicle, a two-wheeled vehicle such as a motorcycle, a motorized bicycle, construction equipment, a bicycle, a train traveling on rails, and the like. A conventional vehicle acquires thermal energy by burning fossil fuels (e.g., gasoline or diesel), converts the thermal energy into mechanical energy necessary to rotate vehicle wheels and thereby generates the power to rotate vehicle wheels.

Recently, electrical energy has been used to generate power needed to rotate vehicle wheels instead of thermal energy. As described above, the vehicle configured to acquire power using electric energy is referred to as an electric vehicle (EV). Various types of electric vehicles may be used, for example, a general electric vehicle (EV) that is configured to acquire power only using electric energy, a hybrid electric vehicle (HEV) that is configured to acquire power using thermal energy produced by combustion of fossil fuels and also using electric energy and a plug-in hybrid electric vehicle (PHEV) configured to use both thermal energy generated from combustion of fossil fuels and electric energy and charge a battery embedded therein upon receiving electric energy from an external supply.

The above information disclosed in this section is merely for enhancement of understanding of the background of the disclosure and therefore it may contain information that does not form the prior art that is already known in this country to a person of ordinary skill in the art.

SUMMARY

A power conversion apparatus for reducing the overall size and efficiently charging at least one of an electric load and a battery, a method for controlling the power conversion apparatus and a vehicle including the power conversion apparatus are provided.

According to an aspect of the present disclosure a power conversion apparatus may include a first power conversion portion, a first end connected to a first battery and a second end selectively connected to at least one of a power-supply portion and a second battery, a second power conversion portion, a first end connected to the first battery and a second end connected to the second battery, configured to provide power supplied from the first battery to the second battery and a switching portion configured to connect any one of the power-supply portion and the second battery to the first power conversion portion.

The first power conversion portion may provide power supplied from the power-supply portion to the first battery when the first power conversion portion is connected to the power-supply portion. The first power conversion portion may provide power supplied from the first battery to the second battery when the first power conversion portion is connected to the second battery. The first power conversion portion may step up (e.g. increase) a voltage received from the power-supply portion when the first power conversion portion is connected to the power-supply portion. The first power conversion portion may step down (e.g., decrease) a voltage received from the first battery when the first power conversion portion is connected to the second battery.

The second power conversion portion may decrease a voltage received from the first battery. The first power conversion portion and the second power conversion may initiate operation when charging is performed using the power-supply portion to allow the first power conversion portion to provide power supplied from the power-supply portion to the first battery and the second power conversion portion to provide power supplied from the first battery to the second battery.

Any one of the first power conversion portion and the second power conversion portion may operate to provide power of the first battery to the second battery when an electrically-connected external device is configured to request a relatively smaller amount of power or the second battery is charged with low power. The first power conversion portion may have a maximum power capacity different from the maximum power capacity of the second power conversion portion. The first power conversion portion and the second power conversion portion may be configured to operate simultaneously to provide power of the first battery to the second battery when an electrically-connected external device requests a relatively larger amount of power or the second battery is charged with high power.

The first switch element and the second switch element may be connected in parallel between the first battery and the second battery. The power conversion apparatus may include a controller configured to operate at least one of the first power conversion portion, the second power conversion portion, and the switching portion. At least one of the first power conversion portion and the second power conversion portion may include a low voltage direct current-direct current (DC-DC) converter (LDC). The power-supply portion may include a solar power generator configured to output power corresponding to incident solar light.

According to another aspect of the present disclosure, a method for controlling a power conversion apparatus may include initiating, by a controller, a power conversion apparatus, charging, by the power conversion apparatus, a first battery and a second battery using a power-supply portion, forming an electrical connection between a first power conversion portion and the power-supply portion, initiating, by the controller, operation of the first power conversion portion and a second power conversion portion, operating, by the controller, the first power conversion portion to provide power supplied from the power-supply portion to the first battery, and operating, by the controller, the second power conversion portion to provide power supplied from the first battery to the second battery. Additionally, a first end of the first power conversion portion may be connected to the first battery and a second end of the first power conversion portion may be selectively connected to at least one of the power-supply portion and the second battery according to a control signal. The second power conversion portion electrically connects the first battery to the second battery.

The method may further include initiating, by the controller, starting operation of any one of the first power conversion portion and the second power conversion portion when an electrically-connected external device requests a relatively smaller amount of power or the second battery is charged with low power and providing power supplied from the first battery to the second battery through any one of the first power conversion portion and the second power conversion portion. The first power conversion portion may have a maximum power capacity different from the maximum power capacity of the second power conversion portion.

In another exemplary embodiment, the method may include forming an electrical connection between the first power conversion portion to the second battery. In particular, the method may include forming an electrical connection between the first power conversion portion to the second battery when an electrically-connected external device requests a relatively larger amount of power or the second battery is charged with high power, simultaneously operating the first power conversion portion and the second power conversion portion, and providing power supplied from the first battery to the second battery through both of the first power conversion portion and the second power conversion portion.

In another aspect of the exemplary embodiments, a vehicle may include a power-supply portion configured to provide power, a first battery configured to be charged with power supplied from the power-supply portion, and have a relatively high voltage, a second battery configured to be charged with power supplied from the first battery, and have a relatively low voltage, a first power conversion portion having a first end connected to the first battery and a second end selectively connected to at least one of the power-supply portion and the second battery and a second power conversion portion having a first end connected to the first battery and the a second end connected to the second battery, configured to provide power supplied from the first battery to the second battery.

The first power conversion portion and the second power conversion may initiate operation when charging is performed using the power-supply portion. The first power conversion portion may provide power supplied from the power-supply portion to the first battery and the second power conversion portion may provide power supplied from the first battery to the second battery.

The vehicle may include any one of the first power conversion portion and the second power conversion portion that may be configured to initiate operation and provide power supplied from the first battery to the second battery when an electrically-connected peripheral device requests a relatively smaller amount of power or the second battery is charged with low power. The vehicle may include the first power conversion portion and the second power conversion portion configured to simultaneously operate and provide power supplied from the first battery to the second battery when an electrically-connected peripheral device requests a relatively larger amount of power or the second battery is charged with high power.

BRIEF DESCRIPTION OF THE DRAWINGS

These and/or other aspects of the present disclosure will become apparent and more readily appreciated from the following description of the exemplary embodiments, taken in conjunction with the accompanying drawings of which.

DETAILED DESCRIPTION

Figure 1A:
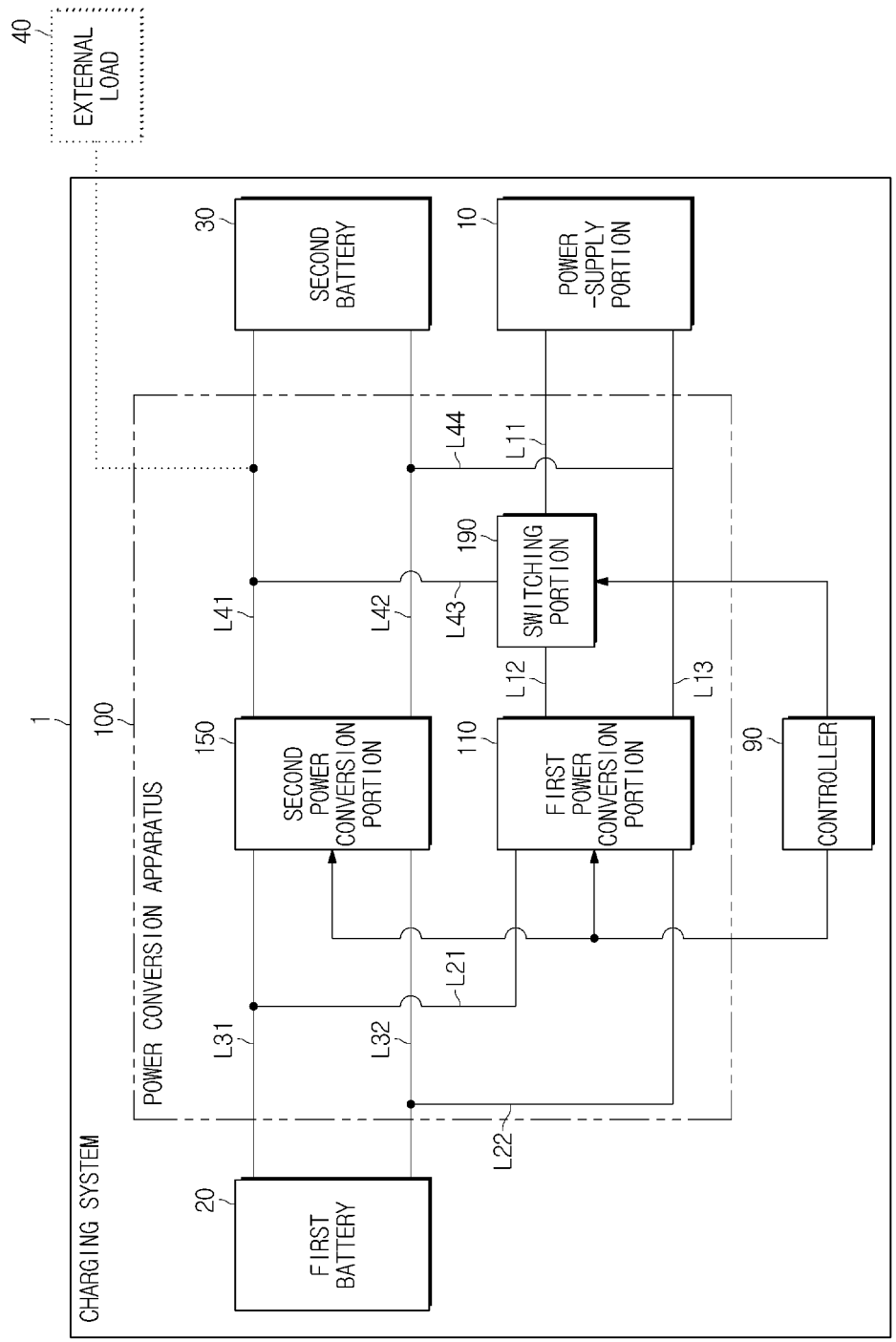
FIG. 1A is an exemplary block diagram illustrating an example of a power conversion apparatus according to an exemplary embodiment of the present disclosure.

Reference will now be made in detail to the exemplary embodiments of the present disclosure, examples of which are illustrated in the accompanying drawings, wherein like reference numerals refer to like elements throughout. The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure. The drawings and description are to be regarded as illustrative in nature and not restrictive and like reference numerals designate like elements throughout the specification. Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In addition, in the following detailed description, names of components, which are in the same relationship, are divided into "the first", "the second", and the like to distinguish the components, but the present disclosure is not limited to the order. Throughout the specification, unless explicitly described to the contrary, the word "comprise" and variations such as "comprises" or "comprising", will be understood to imply the inclusion of stated elements but not the exclusion of any other elements. In addition, "unit", "means", "part", "member", or the like, which is described in the specification, means a unit of a comprehensive configuration that performs at least one function or operation.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

A charging system including a power conversion apparatus will hereinafter be described with reference to FIGS. 1A to 6. FIG. 1A is an exemplary block diagram illustrating an exemplary embodiment of a power conversion apparatus. Referring to FIG. 1A, a charging system 1 may include a power-supply portion 10, a first battery 20, a second battery 30, and power conversion apparatus 100 configured to charge at least one of the first battery 20 and the second battery 30. The power-supply portion 10 may be configured to provide power required to charge at least one of the first battery 20 and the second battery 30.

For example, the power-supply portion 10 may include a device configured to autonomously generate power, other batteries other than the first battery 20, or a power-supply voltage received from the external part. In particular, the apparatus for autonomously generating power may include a device configured to generate power using combustion energy of fuels, a device configured to generate power using wind power or hydraulic power, and a device (e.g., solar generation device) configured to generate power by converting solar energy into electric energy. For example, the solar generation device may include solar cell(s).

The first battery 20 and the second battery 30 may be configured to convert electrical energy into chemical energy, and may thus accumulate and store the resultant electric energy. Each of the first battery 20 and the second battery 30 may be implemented using at least one of various kinds of batteries (e.g., a lead battery, a nickel-cadmium battery, a nickel-hydride battery, a lithium-ion battery, a lithium-ion polymer battery, and a lithium-iron-phosphate battery). However, the scope of the first battery 20 and the second battery 30 is not limited thereto and the first battery 20 and the second battery 30 may be implemented using various types of batteries. The first battery 20 and the second battery 30 may be implemented using homogeneous batteries or heterogeneous batteries.

In accordance with an exemplary embodiment, the first battery 20 and the second battery 30 may have different voltages. For example, the first battery 20 may have a relatively higher voltage than the second battery 30. There may be a substantial difference in voltage between the first battery 20 and the second battery 30. For example, the first battery 20 may have a voltage of about 360V, and the second battery 30 may have a voltage of about 12V. The system designer may establish various voltages for the first battery 20 and various voltages for the second battery 30 according to the use environment or application targets of the charging system 1. Alternatively, the second battery 30 may have a relatively higher voltage than the first battery 20 as necessary.

When the first battery 20 and the second battery 30 have different voltages, the first battery 20 and the second battery 30 may be configured to provide power to different load devices. For example, when the first battery 20 has a relatively higher voltage than the second battery 30, the first battery 20 may be configured to provide power to a high-load device (e.g., a drive motor of a vehicle), and the second battery 30 may be configured to provide power to a medium-load or low-load device (e.g., lights, dashboard, etc. of the vehicle).

In accordance with another exemplary embodiment, the first battery 20 and the second battery 30 may have the same voltage. In particular, the first battery 20 and the second battery 30 may be configured to provide power to the same or different load devices as necessary. The power conversion apparatus 100 may be designed to charge at least one of the first battery 20 and the second battery 30.

In accordance with an exemplary embodiment, the power conversion apparatus 100 may be configured to transmit power supplied from the power-supply portion 10 to the first battery 20, and charge the first battery 20. The power conversion apparatus 100 may be configured to transfer power supplied from the first battery 20 to the second battery 30, and may charge the second battery 30. Accordingly, the power conversion apparatus 100 may be configured to charge at least one of the first battery 20 and the second battery 30.

Referring to FIG. 1, the power conversion apparatus 100 may include a first power conversion portion 100, a second power conversion portion 150 and a switching portion 190. A detailed description of the first power conversion portion 110, the second power conversion portion 150, and the switching portion 190 is as follows. As shown in FIG. 1, lines L11 to L43 may be connected to at least one of the first power conversion portion 110, the second power conversion portion 150 and the switching portion 190 and may include conductive lines and circuits capable of electrical signal transmission, a device capable of transmitting other electrical signals, or the like.

A first end of the first power conversion portion 110 may be connected to the switching portion 190, and a second end thereof may be connected to the first battery 20. The first battery 110 may be electrically connected to the switching portion 190 through at least one line L12. The first power conversion portion 110 may be connected to the power-supply portion 10 and the second battery 30 through predetermined lines L13 and L14 to facilitate current flow. In particular, the line L44 branched from any one line L42 to interconnect the second battery 30 and the second power conversion portion 150 may be connected to the line L13 to interconnect the power-supply portion 10 and the first power conversion portion 110. Accordingly, the first power conversion portion 110 may be connected to at least one of the power-supply portion 10 and the second battery 30. Additionally, the first power conversion portion 110 may be connected to the first battery 20 through at least one line L21 and L22. In other words, the second one of the at least one line L21 and L22 may be designed to connect to or enter at least one line L31 and L32 to interconnect the first battery 20 and the second power conversion portion 150.

The first power conversion portion 110 may be configured to selectively transfer the electrical signal (e.g., current) in both directions. In other words, the first power conversion portion 110 may be configured to transmit the electrical signal from a first end to a second end, or vice versa. Particularly, the first power conversion portion 110 may be configured to transmit power (e.g., current) supplied to a first end connected to the switching portion 190 to the second end connected to the first battery 20, and transmit power supplied to the second end connected to the first battery 20 to a first end connected to the switching portion 190, the power-supply portion 10, or the second battery 30. When necessary, the first power conversion portion 110 may be configured to terminate operation to prevent the electrical signal from being applied in any direction. The transmission direction of the electrical signal by the first power conversion portion 110 or the operation or non-operation of the first power conversion portion 110 may be executed by a control device embedded in the first power conversion portion 110, or may be executed by a control signal received from a controller 90 disposed on the exterior as necessary. In accordance with an exemplary embodiment, the first power conversion portion 110 may be implemented using a low voltage DC-DC converter (LDC).

The first end of the second power conversion portion 150 may be connected to the first battery 20, and the second end thereof may be connected to the second battery 30. The second power conversion portion 150 may be electrically connected to the first battery 20 via at least one line L31 and L32 and may be configured to facilitate current flow. As described above, at least one line L31 and L32 that interconnects the second power conversion portion 150 and the second battery 20 may be branched from a single position, and may be connected to the first power conversion portion 110 through at least one line L21 and L22.

Additionally, the second power conversion portion 150 may be electrically connected to the second battery 30 via at least one line L41 and L42. In particular, any one of the lines L43 and L44 branched from a position of the at least one line L41 and L42 may be connected to the switching portion 190. The line L12 that interconnects the first power conversion portion 110 and the switching portion 190 may be electrically connected to any one line L43 according to the operation of the switching portion 190. The second line L44 may be connected to the first power conversion portion 110. In particular, the second line L44 may be designed to connect to or enter any one line L13 that interconnects the first power conversion portion 110 and the power-supply portion 10. In accordance with an exemplary embodiment, the at least one line L41 and L42 may be electrically connected to the other external load 40 other than the second battery 30. In particular, the at least one line L41 and L42 may be connected to the external load 40, or may be connected to both the second battery 30 and the external load 40. When the at least one line L41 and L42 is connected to both the second battery 30 and the external load 40, a line connected to the external load 40 may also be branched from the at least one line L41 and L42.

The second power conversion portion 150 may be configured to transmit the electrical signal in one direction. For example, the second power conversion portion 150 may be configured to transmit the electrical signal in the direction from the first end receiving power from the first battery 20 to the second end connected to the second battery 30. Therefore, the second power conversion portion 150 may be configured to initiate operation and power may be applied from the first battery 20 to the second battery 30. Alternatively, the second power conversion portion 150 may be configured to terminate operation, resulting in prevention of power transmission from the first battery 20 to the second battery 30. Information regarding whether the second power conversion portion 150 operates may be determined by the control device embedded in the first power conversion portion 110, or may be determined by a control signal received from the external controller 90.

In accordance with an exemplary embodiment, the second power conversion portion 150 may be implemented using a low voltage DC-DC Converter (LDC) in the same manner as in the first power conversion portion 110. The first power conversion portion 110 and the second power conversion portion 150 may have the same or different maximum power capacities. When the first power conversion portion 110 and the second power conversion portion 150 have different maximum power capacities, any one of the first power conversion portion 110 and the second power conversion portion 150 may have a relatively lower maximum power capacity than the other one. In particular, the maximum power capacity of any one power conversion portion 110 or 150 may be about double that of the other one 150 or 110.

For example, the maximum power capacity of the first power conversion portion 110 may be set to about 0.6 kW, and the maximum power capacity of the second power conversion portion 150 may be set to about 1.2 kW, which is double that of the maximum power capacity 0.6 kW of the first power conversion portion 110. However, power capacity of the first power conversion portion 110 and power capacity of the second power conversion portion 150 are not limited thereto, and may be established in various manners. For example, the maximum power capacity of the first power conversion portion 110 and the maximum power capacity of the second power conversion portion 150 may be determined based on either the size of the external load 40 connected to the charging system 1 or capacity of the second battery 30. In particular, any one load region in which power supplied from the charging system 1 is most frequently used may be used as a rated load region.

Accordingly, the maximum power capacity of the first power conversion portion 110 may be determined. Alternatively, the other load region in which power supplied from the charging system 1 is frequently used may be a rated load region and the maximum power capacity of the second power conversion portion 150 may be determined. Additionally, the general charging system may use one LDC. In the above-mentioned exemplary embodiment, the maximum power capacity of the first power conversion portion 110 and the maximum power capacity of the second power conversion portion 150 may be determined by distributing maximum power capacity of the LDC of a general charging system according to a predetermined rate. In other words, when the LDC of the general charging system has maximum power capacity of about 1.8 kW, the maximum power capacity of the first power conversion portion 110 and the maximum power capacity of the second power conversion portion 150 may also be respectively set to about 0.6 kW and about 1.2 kW acquired when 1.8 kW is distributed at the ratio of 1:2.

In accordance with an exemplary embodiment, the first power conversion portion 110 and the second power conversion portion 150 may be connected in parallel to each other between the first battery 20 and the second battery 30. However, in other exemplary embodiments, the first power conversion portion 110 and the second power conversion portion 150 may not be connected in parallel to each other. Detailed structures and operations of the first power conversion portion 110 and the second power conversion portion 150 will hereinafter be described in detail.

The switching portion 190 may selectively connect the first power conversion portion 110 to the power-supply portion 10 according to the switching operation, or may selectively connect the first power conversion portion 110 to the second battery 30 according to the switching operation. The switching portion 190 may be connected to the power-supply portion 10 through at least one line L11, and may be connected to the second battery 30 via the other (e.g., second) line L43. Additionally, the switching portion 190 may be connected to the first power conversion portion 110 via yet another line L12. The switching portion 190 may connect at least one line L11 to the line L12 connected to the first power conversion portion 110, or may connect the other (e.g., second) line L43 to the line L12 connected to the first power conversion portion 110 via the other (e.g., second) line L43. Accordingly, the first power conversion portion 110 may be selectively connected to the power-supply portion 10 or the second battery 30.

When the switching portion 190 connects at least one line L11 to the line L12 connected to the first power conversion portion 110, the first power conversion portion 110 may be connected to the power-supply portion 10 and power may be supplied from the power-supply portion 10 to the first power conversion portion 110. Additionally, when the switching portion 190 connects at least one other (e.g., second) line L43 to the line L12 connected to the first power conversion portion 110, the first power conversion portion 110 may be connected to the second battery 30 and power may be supplied from the first battery 20 to the second power conversion portion 120.

Operations of the switching portion 190 may be configured to operate by a control signal of the controller 90. In accordance with an exemplary embodiment, the charging system 1 may further include the controller 90. The controller 90 may be configured to generate a predetermined electrical signal (hereinafter referred to as a control signal) based on user manipulation or a predefined setting, may be configured to transmit the generated control signal to the corresponding constituent component (e.g., at least one of the first power conversion portion 110, the second power conversion portion 150, and the switching portion 190), and may be configured to adjust at least one of the first power conversion portion 110, the second power conversion portion 150, and the switching portion 190.

For example, the controller 90 may be configured to determine any one of the following three examples. The first example includes at least one of the first battery 20 and the second battery 30 require charging using the power-supply portion 10. The second example includes the second battery 30 requires charging using the first battery 20. The third example includes power require to be supplied to the external load 40 using at least one of the first battery 20 and the second battery 30. As a result, the controller 90 may be configured to generate a control signal based on the result of determination and the controller 90 may be configured to operate at least one of the first power conversion portion 110, the second power conversion portion 150, and the switching portion 190.

The controller 90 may be implemented using a Central Processing Unit (CPU) or a Micro Controller Unit (MCU), or may be implemented using an Electronic Control Unit (ECU). The CPU, the MCU, or the ECU may be implemented using one or more semiconductor chips or associated constituent components. In addition, the CPU, the MCU, or the ECU may process various types of operations of the vehicle 1 based on programs or data embedded or entered by the user. A detailed example of the power conversion apparatus 100 including the first power conversion portion 110 and the second power conversion portion 150 will hereinafter be described in detail. The power conversion apparatus 100 will hereinafter be described in an exemplary embodiment that uses a bidirectional LDC (low voltage DC-DC converter) as the first power conversion portion 110, and in another exemplary embodiment that uses a unidirectional LDC as the second power conversion portion 150.

Figure 1B:
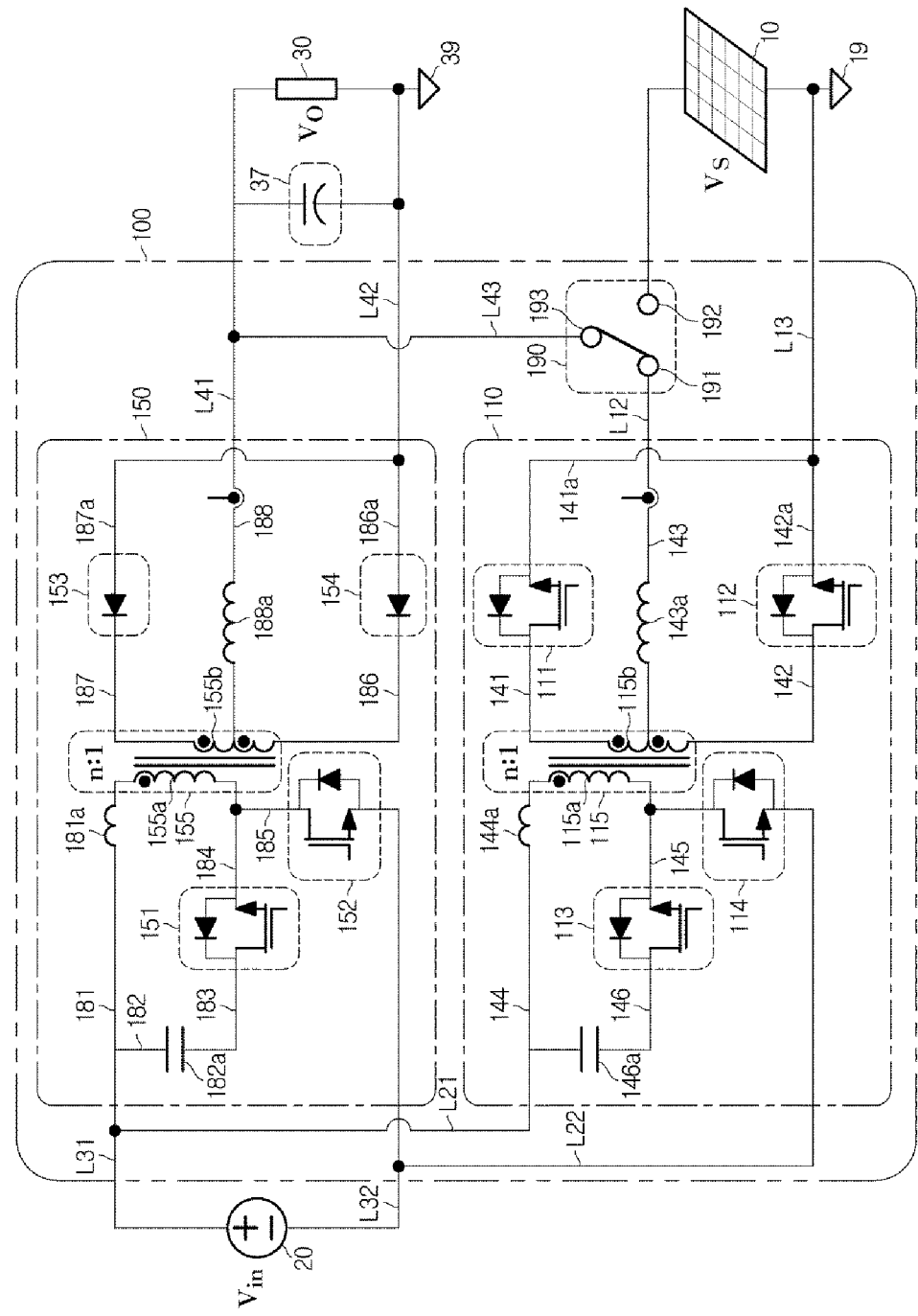
FIG. 1B is an exemplary circuit diagram illustrating an example of the power conversion apparatus according to an exemplary embodiment of the present disclosure.

FIG. 1B is an exemplary circuit diagram illustrating an example of the power conversion apparatus. Referring to FIG. 1B, the first power conversion portion 110 may include at least one switch element 111, 112, 113 and 114 (hereinafter respectively referred to as first, second, third, and fourth switch elements for convenience of description) to obstruct (e.g., block) flow of a current or to determine the flow direction of a current and a transformer portion 115 for voltage transformation and lines 141, 141a, 142, 142a, 143, 144, 145 and 146 configured to interconnect the transformer portion 115 and the switch elements 111 to 114. The first power conversion portion 110 may further include various types of circuit components 143a and 146a.

Figure 2A:
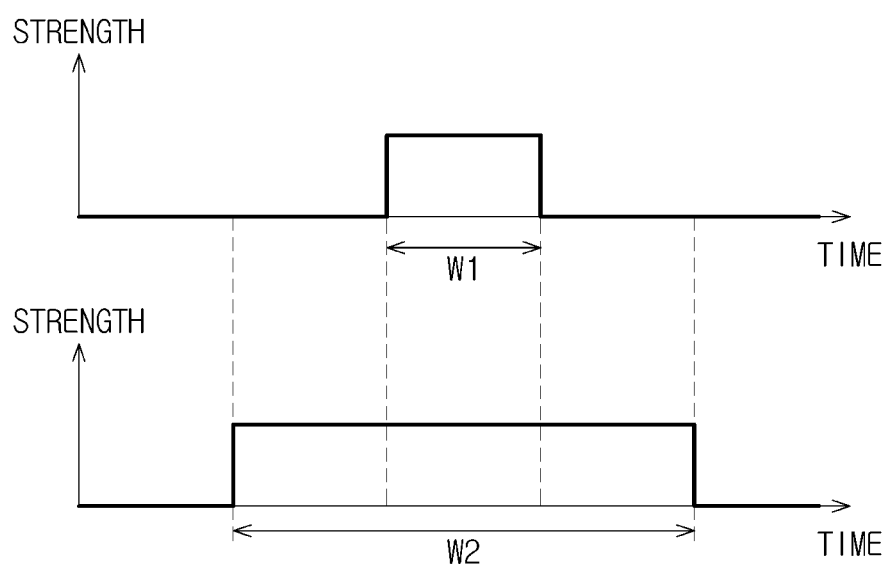
FIG. 2A is an exemplary graph that illustrates operations of at least one of the first switch element and the second switch element according to an exemplary embodiment of the present disclosure.

FIG. 2A illustrates exemplary operations of at least one of the first switch element and the second switch element. Since the power-supply portion 19 and the second battery 30 are respectively connected to ground terminals 19 and 39, any one line L42 branched from the line L42 connected to the second battery 30 may be substantially omitted. Accordingly, any one line L42 branched from the line L42 connected to the second battery 30 may be omitted from FIG. 2A.

The first switch element 111 and the second switch element 112 may be arranged in the direction of the switching portion 190, the power-supply portion 10 and the second battery 30 based on the position of the transformer portion 115. For example, as shown in FIG. 1B, a first end of the first switch element 111 may be connected to the line 141 extended from a first end of a first coil 115b, the second end thereof may be connected to the line 141a branched from the line L13 that interconnects the first power conversion portion 110 and the power-supply portion 10. The first end of the second switch element 112 may be connected to the line 144 extended from the second end of the first coil 115b of the transformer portion 115, and the second end thereof may be connected to the line L14 that interconnects the first power conversion portion 110 and the power-supply portion 10.

The first power conversion portion 110 may include the first switch element 111 and the second switch element 112 at the positions of resistors 153 and 154 in a different way from the second power conversion portion 150. Accordingly, the first power conversion portion 110 may be configured to transmit power in a direction of the first battery 20 or may be configured to transmit power in the opposite direction to the direction of the first battery 20. In accordance with an exemplary embodiment, the first switch element 111 and the second switch element 112 may be configured to operate in the same manner. In other words, when the first switch element 111 is in an operation state (ON state), the second switch element 112 starts operation (ON state). When the first switch element 111 terminates operation (OFF state), the second switch element 112 may be configured to terminate operation (OFF state).

Each of the first switch element 111 and the second switch element 112 may be configured to output a pulse width modulation (PWM) signal as necessary. In other words, the first switch element 111 and the second switch element 112 may be configured to respectively adjust the widths w1 and w2 of the output signals. In particular, the first switch element 111 and the second switch element 112 may be configured to increase or decrease a voltage supplied to the first battery 20. For example, the widths w1 and w2 of the signal may be proportional to a signal output time. In other words, when a signal output from at least one of the first switch element 111 and the second switch element 112 is output for a relatively long duration, the signal width (w2) may increase. When the signal output from at least one of the first switch element 111 and the second switch element 112 is output for a relatively short duration, the signal width (w1) may decrease.

In particular, as shown in the upper part of FIG. 2A, when the signal width (w1) output from at least one of the first switch element 111 and the second switch element 112 is relatively small (e.g., when the ON duration is short), a voltage supplied to the first battery 20 may be decreased. In contrast, as shown in the lower part of FIG. 2A, when the signal width (w2) output from at least one of the first switch element 111 and the second switch element 112 is relatively large (e.g., when the ON duration is long), a voltage supplied to the first battery 20 may be increased (e.g., or boosted). In other words, increasing or decreasing the voltage may be performed by a switching duty ratio of at least one of the first switch element 111 and the second switch element 112. Accordingly, the voltage of the electrical signal, that is supplied from the power-supply portion 10 by the operations of the first and second switch elements 111 and 112 and is then applied to the first battery 20, may be increased.

In accordance with an exemplary embodiment, the operation of at least one of the first switch element 111 and the second switch element 112 may be operated by the controller 90. When the first switch element 111 and the second switch element 112 operate in the same manner, this operation of the first and second switch elements 111 and 112 may be performed when the first battery 20 is charged by the power-supply portion 10.

Each of the first switch element 111 and the second switch element 112 may be implemented using a transistor. In particular, the transistor may be implemented using at least one of a Bipolar Junction Transistor (BJT), a thyristor, a Field Effect Transistor (FET), and an Insulated Gate Bipolar mode Transistor (IGBT). The FET may be implemented using a metal semiconductor field-effect transistor (MESFET), and/or a metal oxide semiconductor field effect transistor (MOSFET), etc. Additionally, various switch elements may be implemented as at least one of the first switch element 111 and the second switch element 112.

The transformer portion 115 may be configured to increase (e.g., step up or boost) or decrease (e.g., step down) the received voltage. For example, the transformer portion 115 may include a plurality of coils 115a and 115b disposed to face each other and a plurality of cores (not shown) on which the coils 115a and 115b are respectively wound. The transformer portion 115 may be configured to perform voltage transformation based on the turn ratios of the respective coils 115a and 115b.

At least one line 143 extended from the line L12 connected to the switching portion 190 may be formed in the first coil 115a. According to the position at which at least one line 143 may be connected to the first coil 115b, the turn ratio of the first coil 115b may be adjusted to alter the degree of voltage boosting or reducing by the transformer portion 115. At least one line 143 may transfer power to the first coil 115b or transfer the output power of the first coil 115b to the switch element 190. In accordance with an exemplary embodiment, an inductor 143a may be formed in at least one line 143 connected to the switching portion 190.

The third switch element 113 and the fourth switch element 115 may be disposed in the direction of the first battery 20 based on the transformer portion 115. In particular, the first end of the third switch element 113 may be connected to the line 145 connected to the first end of the second coil 115a of the transformer portion 115. The second end thereof may be connected to the line 146 branched from the line 144 connected to the second end of the second coil 115a. The line 144 connected to the second end of the second coil 115a may be connected to any one line L21 connected to the first battery 20. In accordance with an exemplary embodiment, a capacitor 146a may be coupled to the line 146 branched from the line 144 connected to the second end of the second coil 115a. In addition, the capacitor may be disposed between a branch point and the third switch element 113. A first end of the fourth switch element 114 may be connected to the line branched from the line 145 connected to a first end of the second coil 115*a*, and the second end thereof may be connected to the line L22 connected to the first battery 20.

Figure 2B:
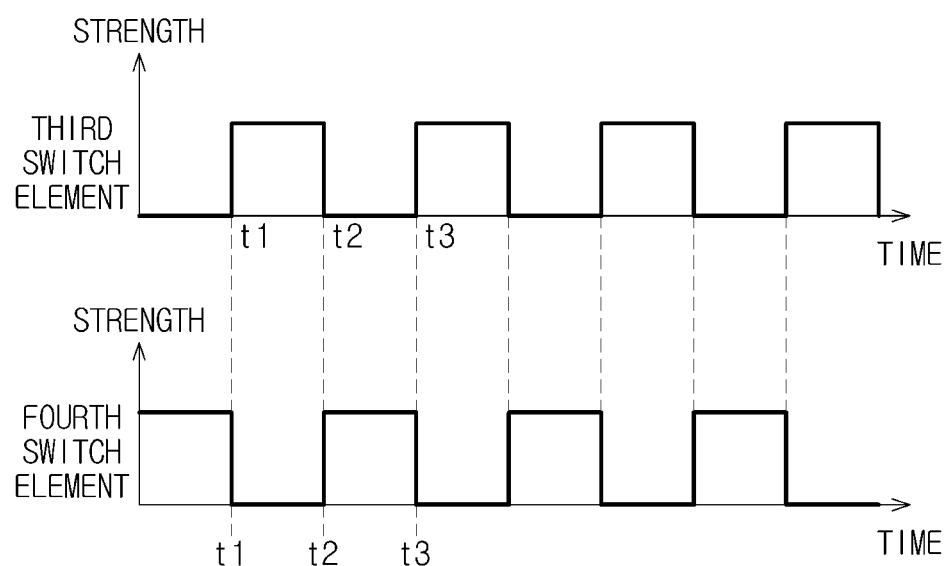
FIG. 2B is an exemplary graph that illustrates operations of the third switch element and the fourth switch element according to an exemplary embodiment of the present disclosure.
Figure 2C:
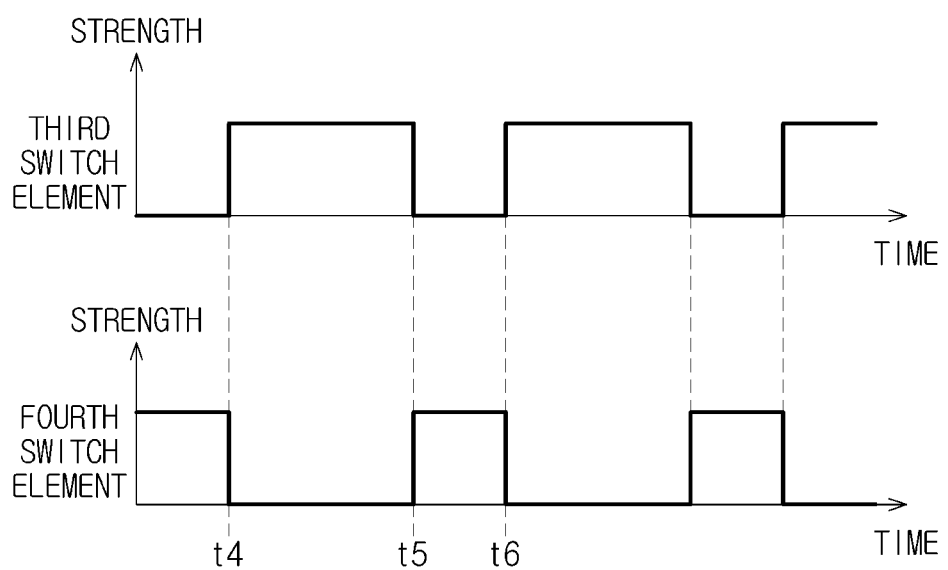
FIG. 2C is an exemplary graph that illustrates operations of the third switch element and the fourth switch element according to an exemplary embodiment of the present disclosure.

FIG. 2B is an exemplary diagram illustrating operations of the third switch element and the fourth switch element. FIG. 2C is an exemplary second diagram illustrating operations of the third switch element and the fourth switch element. Referring to FIGS. 2B and 2C, the third switch element 113 and the fourth switch element 115 may be configured to operate according to predetermined setting or may be configured to operate in opposite manners upon receiving a control signal from the external part. In other words, when the third switch element 113 operates, the fourth switch element 114 may be configured to terminate operation at time points (t1 to t2, t4 to t5). In contrast, when the third switch element 113 terminates operation, the fourth switch element 114 may be configured to operate at time points (t2 to t3, t5 to t6). Accordingly, the output current of the third switch element 113 may be opposite in phase to the output current of the fourth switch element 114.

The voltage may be increased or decreased based on the length (e.g., ON time or ON duration) of the operation times of the first switch element 113 and the fourth switch element 114. For example, as shown in FIG. 2B, when the third switch element 113 operates for a relatively short duration and transmits a current at time points t1-t2, the voltage may be decreased. For example, the voltage (i.e., the voltage applied to the second battery 30) transferred from the first battery 20 to the second battery 30 may be decreased. In contrast, as shown in FIG. 2C, when the third switch element 113 operates for a relatively long duration and transmits a current at time points t4-t5, the voltage may be increased. For example, the voltage (i.e., the voltage applied to the second battery 30) transferred from the first battery 20 to the second battery 30 may be increased. Therefore, the voltage transferred from the first battery 20 to the second battery 30 may be boosted by the third switch element 113 and the fourth switch element 114.

In accordance with an exemplary embodiment, at least one of the third switch element 113 and the fourth switch element 114 may be configured to operate by the above-mentioned controller 90. In addition, the alternate operation of the third switch element 113 and the fourth switch element 114 may be executed when the second battery 30 is charged by the first battery 20. The third switch element 113 and the fourth switch element 114 may be implemented using predetermined transistors in the same manner as in the first switch element 11 and the second switch element 112. For example, each of the third switch element 113 and the fourth switch element 114 may be implemented using an insulated gate bipolar mode transistor (IGBT). When all or some of the first to fourth switch elements 111 to 114 terminate operation, the first power conversion portion 110 may be configured to terminate operation, and a current supplied from the power-supply portion 10 or the first battery 20 may be unable to flow (e.g. blocked) through the first power conversion portion 110.

Referring to FIG. 1B, the second power conversion portion 150 may include at least one switch element 151 and 152 (hereinafter respectively referred to as a fifth switch element and a sixth switch element) to obstruct (e.g., block) flow of a current or to determine the flow direction of current, a transformer portion 115 configured to perform voltage transformation and at least one line 181, 182, 183, 184, 185, 186, 187 and 188 to connect the transformer portion 115 to the at least one switch element 151 and 152. The second power conversion portion 150 may further include various types of circuit components 188*a*. The second power conversion portion 150 may further include various circuit components 188*a*

The fifth switch element 151 and the sixth switch element 152 may be disposed in the direction of the first battery 20 based on the transformer portion 155, as shown in FIG. 1B. For example, a first end of the fifth switch element 151 may be connected to the line 184 extended from the first end of the third coil 155*a* of the transformer portion 155, and the second end of the fifth switch element 151 may be connected to the lines 182 and 183 branched from the line 181 extended from the second end of the third coil 155*a*. The line 181 extended from the second end of the third coil 155*a* may be connected to the line 181 extended from the line L31 electrically connected to the first battery 20. A capacitor 182*a* may be further connected to the lines 182 and 183 branched from the line 181 extended from the second end of the third coil 155*a*. The first end of the sixth switch element 152 may be connected to the line 185 branched from the line 184 connected to the first end of the third coil 155*a*, and the second end of the sixth switch element 152 may be connected to the line L32 electrically connected to the first battery 20.

The fifth switch element 151 and the sixth switch element 152 may be configured to operate in the same manner as in the third switch element 113 and the fourth switch element 114. In other words, as shown in FIG. 2C, the fifth switch element 151 and the sixth switch element 152 may be configured to operate in opposite manners. In addition, the fifth switch element 151 and the sixth switch element 152 may be configured to increase or reduce the voltage of the electrical signal transferred in the direction of the second battery 30 based on the length of the operation duration (ON time). Both the fifth switch element 151 and the sixth switch element 152 may simultaneously terminate operation. In particular, the second power conversion portion 150 terminates operation, and power supplied from the first battery 20 may not be transferred to the second battery 30 through the second power conversion portion 150. The fifth switch element 151 and the sixth switch element 152 may also be operated upon receiving a control signal from the external controller 90.

The transformer portion 155 may be configured to increase or reduce the voltage received from the first battery 20 (i.e., the installation direction of the fifth switch element 151 and the sixth switch element 152). For example, the transformer portion 155 may include the third coil 155*a* and the fourth coil 155*b* disposed to face each other; and a plurality of cores (not shown) on which the coils 115*a* and 115*b* are respectively wound. The transformer portion 115 may be configured to perform voltage transformation based on the turn ratios of the respective coils 115*a* and 115*b*. The transformer portion 115 may be configured to variably or constantly increase or decreased the voltage based on turn ratios of the third and fourth coils 155*a* and 155*b*.

At least one line 188 connected to the line L41 extended from the second battery 30 may be formed in the fourth coil 155*b*. The turn ratio of the fourth coil 155*b* may be adjusted based on the position at which at least one line 18 is connected to the fourth coil 155*b*. Accordingly, the degree of voltage boosting or reducing by the transformer portion 155 may be adjusted. In accordance with an exemplary embodiment, an inductor 188a may also be formed in at least one line 183 connected to the line L41 extended from the second battery 30 as necessary.

At least one resistor 153 and 154 (hereinafter respectively referred to as a first resistor and a second resistor) may be disposed in the direction of the second battery 30 based on the transformer portion 155. The resistors 153 and 154 may be respectively connected to the lines 186 and 187 connected to both ends of the fourth coil 155b. In other words, a first end of the first resistor 153 may be connected to the line 187 connected to a first end of the fourth coil 155b, and a first end of the second resistor 154 may be connected to the line 186 connected to the second end of the fourth coil 155b. The second ends of the first resistor 153 and the second resistor 154 may be respectively connected to the lines 186a and 187a connected to one line L42 connected to the second battery 30.

In accordance with an exemplary embodiment, at least one of the pluralities of resistors 153 and 154 may herein be omitted. The second power conversion portion 150 may include the resistors 153 and 154 instead of the first and second switch elements 111 and 112 in a different way from the first power conversion portion 110. In other words, the second power conversion portion 150 may be configured to transfer power in one direction. For example, power of the first battery 20 may be transferred in the direction of the second battery 30.

In accordance with an exemplary embodiment, the switching portion 190 may include a first terminal 191 connected to the line L12 connected to the first power conversion portion 110; a second terminal 192 connected to the line L11 connected to the power-supply portion 10; and a third terminal 193 connected to the line L43 connected to the second battery 90. The switching portion 90 may be configured to electrically connect the power-supply portion 10 to the first power conversion portion 110 by interconnecting the first terminal 191 and the second terminal 192, or may be configured to electrically connect the first power conversion portion to the second battery 30 by interconnecting the first terminal 191 and the third terminal 193. Therefore, the other end (e.g., second end) of the first power conversion portion 110 may be selectively connected to at least one of the power-supply portion 10 and the second battery 30. In accordance with an exemplary embodiment, the charging system 1 may further include a condenser 37 connected in parallel to the second battery 30. When the condenser 37 is connected in parallel to the second battery 30, the condenser 37 may have the same or similar voltage as the charging voltage of the second battery 30, and the condenser 37 may be used to measure the charging voltage.

A method for charging the first battery 30 and/or the second battery 30 in various ways according to the above-mentioned operations of the power conversion apparatus 10 will hereinafter be described with reference to FIGS. 3 to 6. The charging method of FIGS. 3 to 6 will hereinafter be disclosed using an example in which maximum power capacity of the first power conversion portion 110 is relatively lower than that of the second power conversion portion 150.

Figure 3:
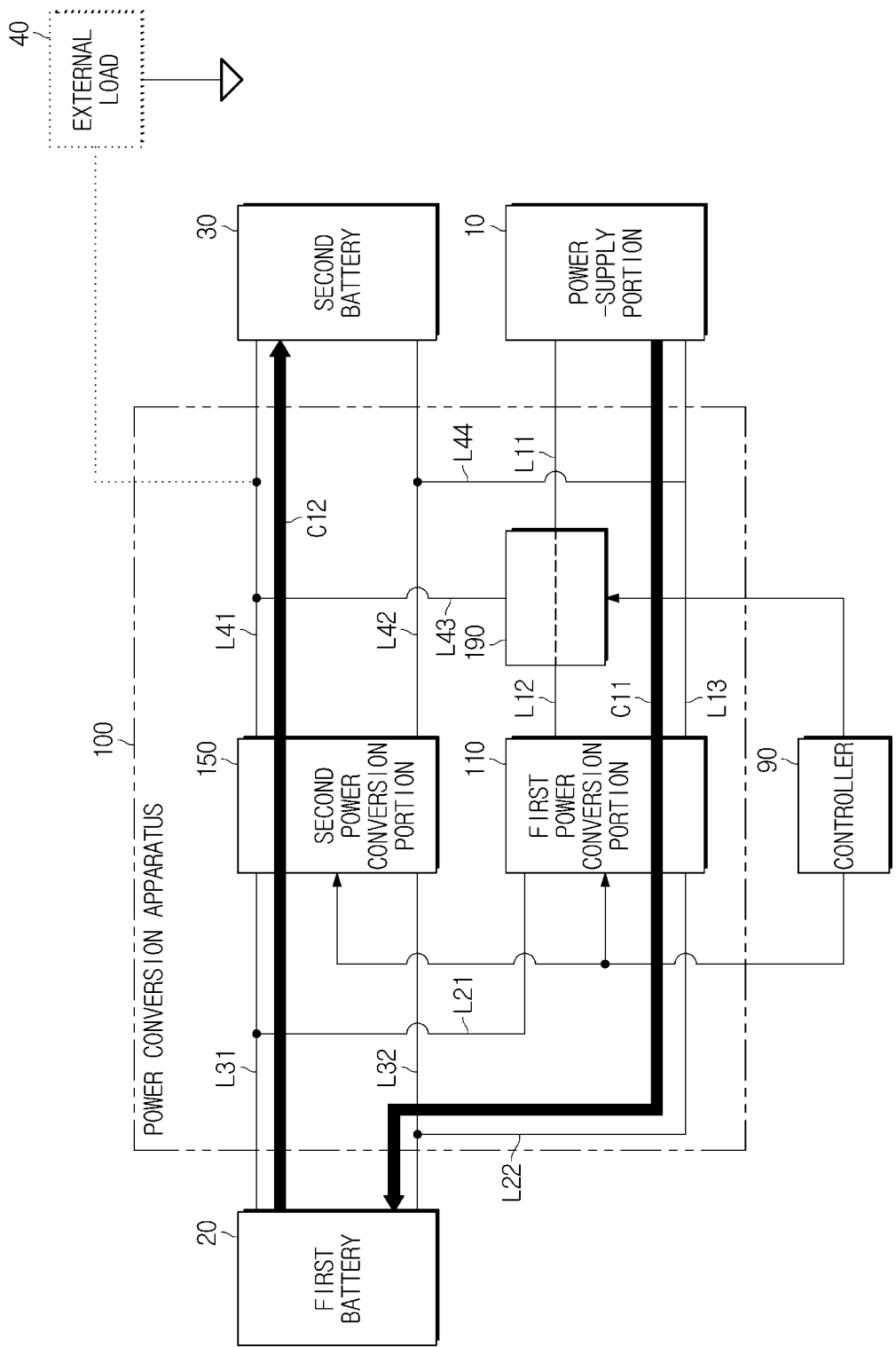
FIG. 3 is an exemplary block diagram that illustrates a first example of the operation of the power conversion apparatus according to an exemplary embodiment of the present disclosure.

FIG. 3 is an example of the operation of the power conversion apparatus. FIG. 3 illustrates an example in which at least one of the first battery 20 and the second battery 30 may be charged upon receiving power from the power-supply portion 10. Referring to FIG. 3, when at least one of the first battery 20 and the second battery 30 is charged upon receiving power from the power-supply portion 10, the switching portion 190 may electrically interconnect the line L12 connected to the first power conversion portion 110 and the line L11 connected to the power-supply portion 10, to allow current to flow between the power-supply portion 10 and the first power conversion portion 110. The first power conversion portion 110 and the switching portion 190 may be configured to simultaneously operate to turn on the first power conversion portion 110. Alternatively, the first power conversion portion 110 and the switching portion 190 may be configured to sequentially operate to turn on the first power conversion portion 110.

In further detail, the first switch element 111 and the second switch element 112 of the first power conversion portion 110 may be configured to be turned on or off as shown in the upper part of FIG. 2A or the lower part of FIG. 2A, to boost (stepped up) or reduce (stepped down) the voltage applied to the first power conversion portion 110. The transformer portion 115 of the first power conversion portion 110 may be configured to operate to convert the voltage applied to the first power conversion portion 110. Therefore, the first power conversion 110 may be configured to output a voltage appropriate for charging the first battery 20. For example, assuming that the voltage supplied from the power-supply portion 10 is about 25V and the charging voltage of the first battery 20 is about 360V, the first power conversion portion 110 may be configured to convert the voltage of about 25V into about 360V or an approximate voltage thereto based on the operation(s) of the first switch element 111, the second switch element 112, and/or the transformer portion 115 of the first power conversion portion 110, and may be configured to output the resultant voltage.

Additionally, the third switch element 113 and the fourth switch element 114 of the first power conversion portion 110 may be configured to operate to supply power from the power-supply portion 10 to the first battery 20. For example, the third switch element 113 may be turned off and the fourth switch element 114 may be turned on to supply to the first battery 20 the transformed electrical signal generated from the transformer portion 115. Accordingly, power supplied from the power-supply portion 10 may be converted using the first power conversion portion 110, and may then be supplied to the first battery 20 (C11), to charge the first battery 20.

In accordance with an exemplary embodiment, when the first power conversion portion 110 initiates operation, the first power conversion portion 110 and the second power conversion portion 150 may be configured to simultaneously operate to turn on the second power conversion portion 150. Alternatively, the first power conversion portion 110 and the second power conversion 150 may be configured to sequentially operate to turn on the second power conversion portion 150.

In particular, the fifth switch element 151 and the sixth switch element 152 may be configured to operate in a manner that power is supplied from the first battery 20 to the second battery 30. For example, the fifth switch element 151 and the sixth switch element 152 may be configured to alternately operate as shown in FIG. 2B or FIG. 2C to increase or decrease the voltage applied to the second power conversion portion 150. Therefore, the second power conversion portion 150 may be configured to acquire a voltage appropriate for charging the second battery 30. For example, when the output voltage of the first battery 20 is 360V and the charging voltage of the second battery 30 is 12V, the second power conversion portion 150 may be configured to convert the voltage of 360V into 12V or an approximate voltage thereto based on the operation(s) of the fifth switch element 151, the sixth switch element 152, and/or the transformer portion 155 of the first power conversion portion 110, and may be configured to output the resultant voltage. Therefore, the output power of the first battery 20 may be configured to be converted by the second power conversion portion 150, and may be supplied to the second battery 30 (C12), to charge the second battery 30.

Figure 4:
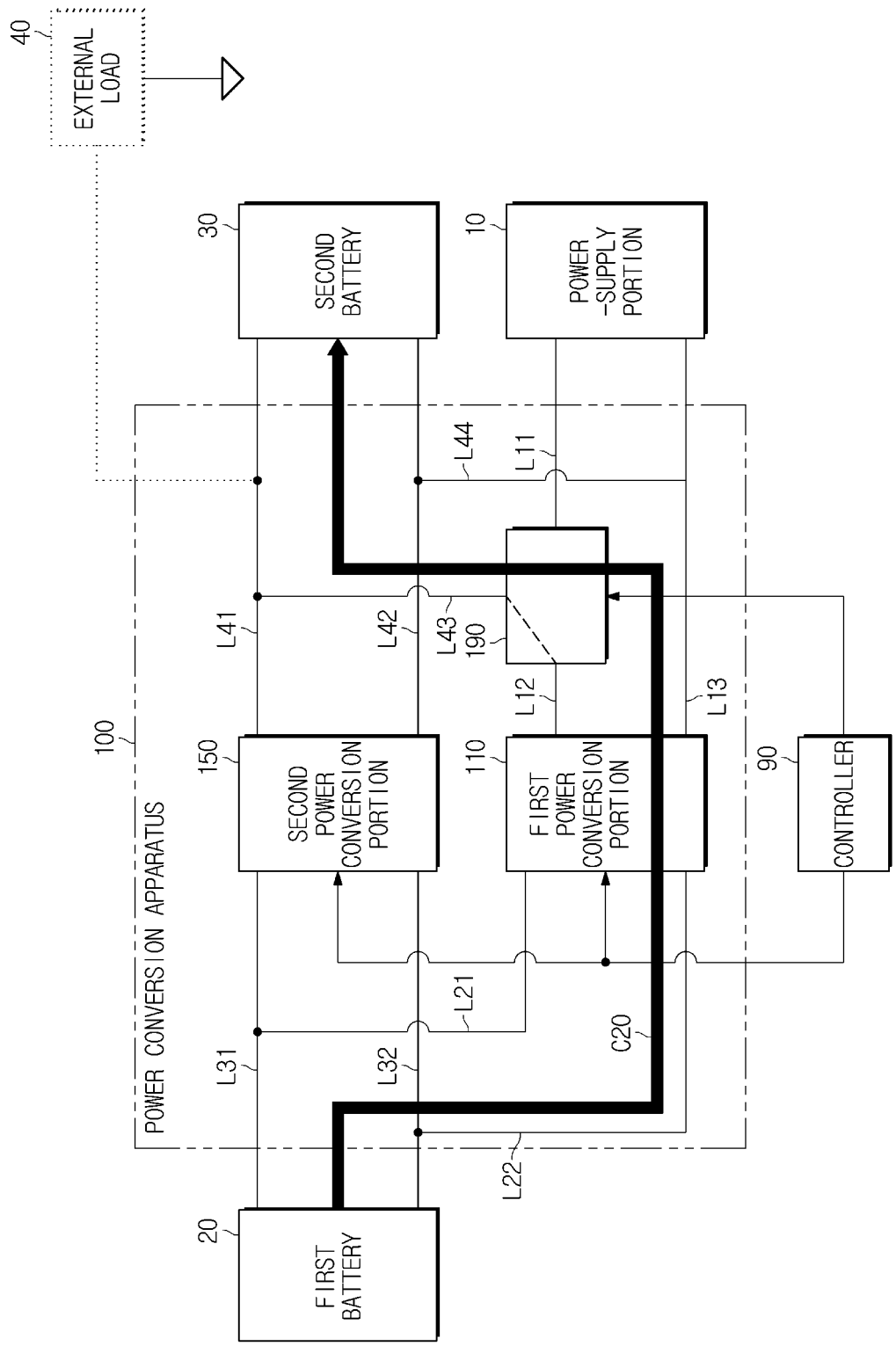
FIG. 4 is an exemplary block diagram that illustrates a second example of the operation of the power conversion apparatus according to an exemplary embodiment of the present disclosure.

FIG. 4 is an exemplary block diagram illustrating a second example of the operation of the power conversion apparatus. FIG. 4 illustrates an example in which the second battery 30 may be configured to be charged with power of the first battery 20 when load requested by the external load 40 is low or the second battery 30 is charged with a low output power. Referring to FIG. 4, when the second battery 30 is charged using the first battery 20, the switching portion 190 may electrically connect the line L12 connected to the first power conversion portion 110 to the line L43 connected to the second battery 30, to enable current flow between the second battery 30 and the first power conversion portion 110. The first power conversion portion 110 and the switching portion 190 may be configured to simultaneously operate to initiate operation of the first power conversion portion 110. Alternatively, the first power conversion portion 110 and the switching portion 190 may be configured to sequentially operate to initiate operation the first power conversion portion 110 starts operation.

The third switch element 113 and the third switch element 114 of the first power conversion portion 110 may be configured to be alternately turned on and off as shown in FIG. 2B or FIG. 2C, to increase or decrease the voltage applied to the first power conversion portion 110 by the first battery 20. Therefore, the first power conversion portion 110 may be configured to acquire a voltage appropriate for charging the second battery 30. For example, when the output voltage of the second battery 30 is 12V and the charging voltage of the first battery 20 is 360V, the third switch element 153 of the first power conversion portion 150 may be turned on for a relatively short duration and may then be turned off, and the fourth switch element 152 may be turned off during a relatively short time and may then turned on as shown in FIG. 2B, resulting in acquisition of a voltage appropriate for charging the second battery 30. Therefore, the output power of the first battery 20 may be converted through the first power conversion portion 110, and may be then supplied to the second battery 30 or the external load 40 (C20).

In particular, the second power conversion portion 150 may not operate. In other words, the second power conversion portion 150 may be turned off and power may be prevented from being applied through the second power conversion portion 150. The fifth switch element 151 and/or the sixth switch element 152 may be prevented from operating based on predefined setting or a control signal of the controller 90 and the second power conversion portion 150 may be turned off.

Further, when the power capacity of the first power conversion portion 110 is relatively higher than power capacity of the second power conversion portion 150 in a different way from the above description, the above-mentioned example may be applied to an exemplary embodiment that includes when a load requested by the external load 40 is normal (medium-load) or when the second battery 30 is charged with a normal output power.

Figure 5:
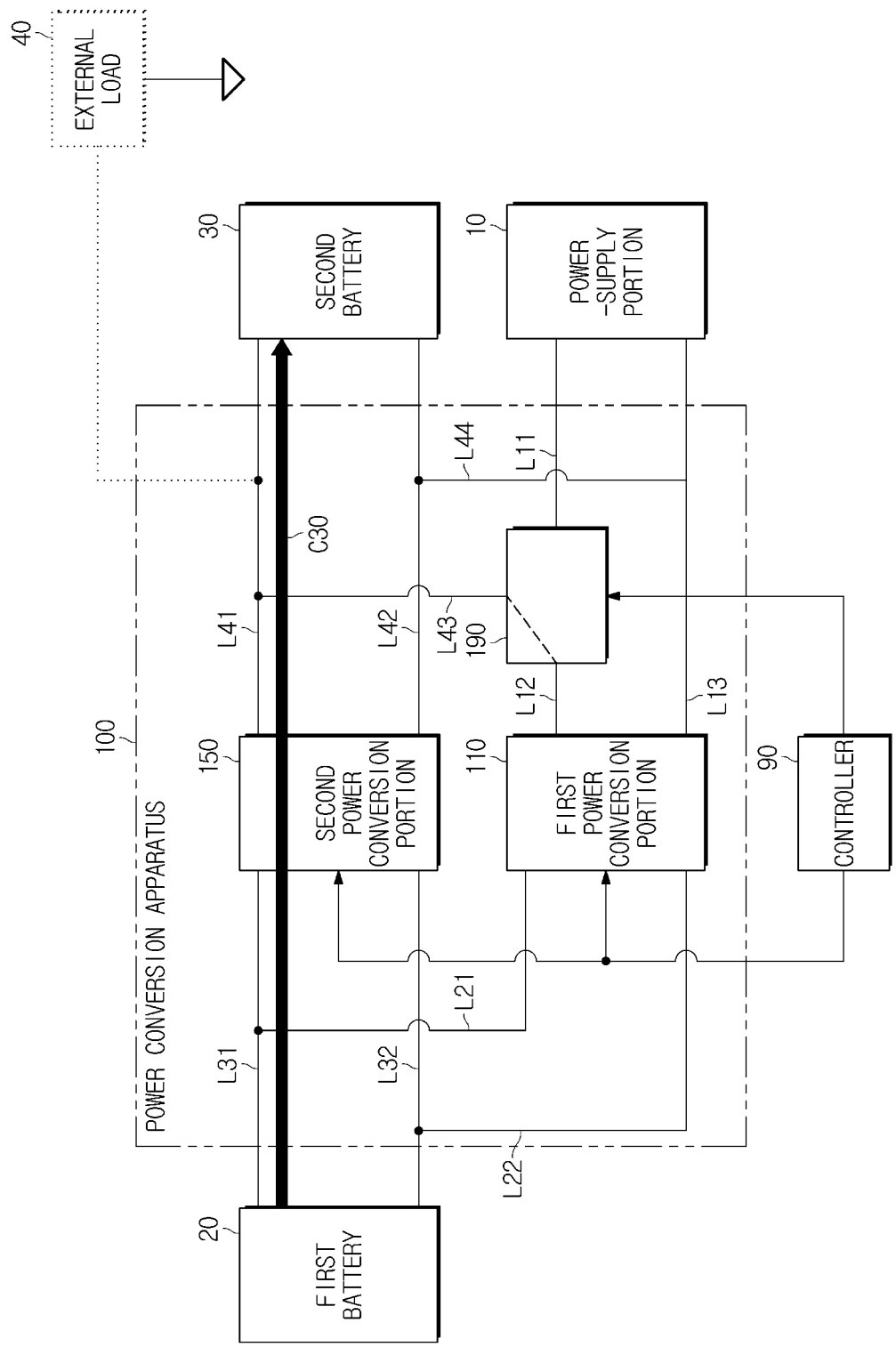
FIG. 5 is an exemplary block diagram that illustrates a third example of the operation of the power conversion apparatus according to an exemplary embodiment of the present disclosure.

FIG. 5 is an exemplary block diagram illustrating a third example of the operation of the power conversion apparatus. FIG. 5 illustrates an example in which the second battery 30 may be charged with power of the first battery 20 when load requested by the external load 40 is medium or the second battery 30 is charged with a normal output power. Referring to FIG. 5, when the second battery 30 is charged using the first battery 20, the switching portion 190 may electrically connect the line L12 connected to the first power conversion portion 110 to the line L43 connected to the second battery 30, and may enable current flow between the second battery 30 and the first power conversion portion 110. The second power conversion portion 150 and the switching portion 190 may be configured to operate simultaneously to initiate operation of the second power conversion portion 150. Alternatively, the second power conversion portion 150 and the switching portion 190 may be configured to sequentially operate to initiate the second power conversion portion 150.

In particular, the fifth switch element 151 and the sixth switch element 152 of the second power conversion portion 150 may initiate operation. Accordingly, the second power conversion portion 120 may be configured to operate to supply power from the first battery 20 to the second battery 30. For example, the fifth switch element 151 and the sixth switch element 152 may be configured to operate alternately as shown in FIG. 2B or FIG. 2C, to boost (stepped up) or reduce (stepped down) the voltage applied to the second power conversion portion 150. In addition, the transformer portion 155 of the second power conversion portion 150 may be configured to increase or reduce the voltage applied to the second power conversion portion 150 based on predefined setting. The second power conversion portion 150 may be configured to output the electrical signal having a voltage appropriate for charging the second battery 30 according to the operations of the fifth switch element 151, the sixth switch element 152, and the transformer portion 155. Therefore, the output power of the first battery 20 may be converted by the second power conversion portion 150 and may be applied to the second battery 30 or the external load 40 (C30). The second battery 30 may be charged or the external load 40 may perform a predetermined operation using the received power.

The first power conversion portion 110 may be configured to be turned off to terminate the first power conversion portion 100. Accordingly, power is not applied through the first power conversion portion 110. All or some of the first switch element 151, the second switch element 152, and the third switch element 153, and the fourth switch element 154 may be prevented from operating based on the predefined setting or a control signal from the controller 90, to transition the first power conversion portion 110 to the OFF state. In contrast, when power capacity of the first power conversion 110 is relatively higher than that of the second power conversion portion 150, the above-mentioned charging process may be utilized when the load requested by the external load 40 is low or an alternate exemplary embodiment when the second battery 30 is charged with a low output power.

Figure 6:
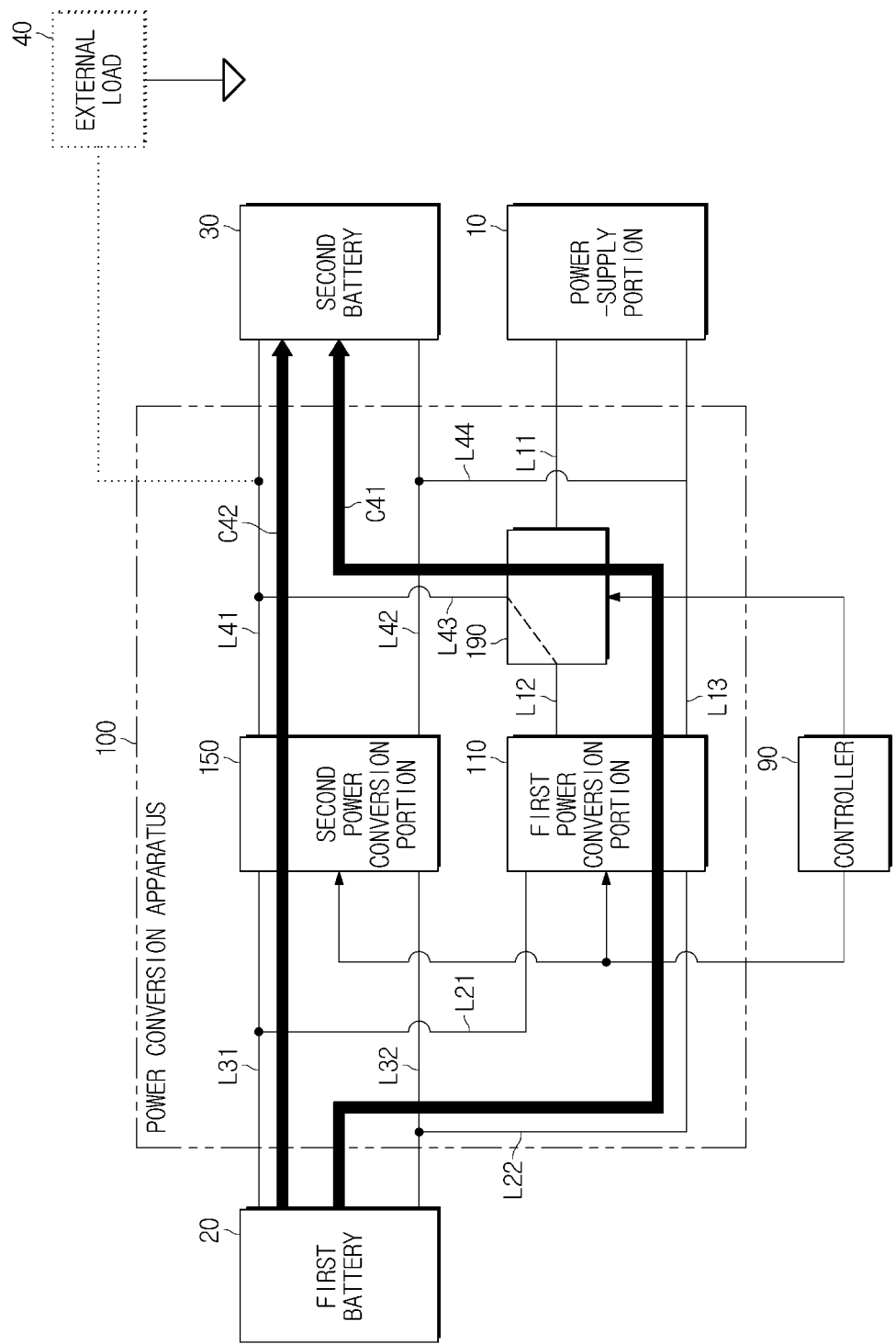
FIG. 6 is an exemplary block diagram that illustrates a fourth example of the operation of the power conversion apparatus according to an exemplary embodiment of the present disclosure.

FIG. 6 is an exemplary block diagram illustrating a fourth example of the operation of the power conversion apparatus. FIG. 6 illustrates an example in which the second battery 30 may be configured to be charged with power of the first battery 20, when load requested by the external load 40 is relatively higher or the second battery 30 may be configured to be charged with a relatively higher output power. Referring to FIG. 6, when the second battery 30 is charged using the first battery 20, the switching portion 190 may electrically connect the line L12 connected to the first power conversion portion 110 to the line L43 connected to the second battery 30, to enable current to flow between the second battery 30 and the first power conversion portion 110.

The first power conversion portion 110, the second power conversion portion 150, and the switching portion 190 may be configured to simultaneously operate. Alternatively, the first power conversion portion 110, the second power conversion portion 150, and the switching portion 190 may be configured to sequentially operate. In addition, the first power conversion portion 110 and the second power conversion portion 150 may be configured to initiate operation at the same time or at different times.

The output power of the first battery 20 may be supplied to the first power conversion portion 110 and the second power conversion portion 120. The third switch element 113 and the third switch element 114 of the first power conversion portion 110 may be configured to increase or decreased the voltage applied to the first power conversion portion 110 by the first battery 20 according to the operations of the third switch element 113, and the fourth switch element 114. For example, the third switch element 153 of the first power conversion portion 110 may be turned on during a relatively short duration and may then be turned off. The fourth switch element 152 may be turned off during a relatively short duration and may then be turned on as shown in FIG. 2B, and the applied voltage may be reduced (stepped down). Therefore, the output power of the first battery 20 may be converted using the first power conversion portion 110, and may then be applied to the second battery 30 or the external load 40 (C41). Charging of the second battery 30 may be started by power supplied to the first power conversion portion 110.

Additionally, the second power conversion portion 150 may be configured to increase or decrease the voltage applied to the second power conversion portion 150 by the first battery 20 according to the operations of the fifth switch element 151 and the sixth switch element 152. For example, the fifth switch element 151 and the sixth switch element 152 may be configured to alternately operate for a relatively short duration as shown in FIG. 2B, may reduce the voltage applied to the second power conversion portion 150 and may thus acquire a voltage for charging the second battery 30. Accordingly, the output power of the first battery 20 may be converted by the second power conversion portion 150, and may then be supplied to the second battery 30 or the external load 40 (C42). The second battery 30 may be charged with power supplied to the second power conversion portion 150.

Therefore, the output power of the first battery 20 may be applied to the second battery 30 or the external load 40 by the first power conversion portion 110 and the second power conversion portion 150. Accordingly, although high power capacity is required to charge the second battery 30 or the external load 40 requests high load, power may be supplied to the second battery 30 or the external load 40. As described above, the power conversion apparatus 100 may be configured to charge the first battery 20 or the second battery 30 with power supplied from the power-supply portion 100 as necessary. Alternatively, the power conversion apparatus 100 may be configured to charge the second battery 30 with power supplied from the first battery 20 by selecting proper power capacity. Therefore, the power conversion apparatus 100 may be configured to efficiently adjust power supply using a relatively minimal number of constituent components.

Figure 7:
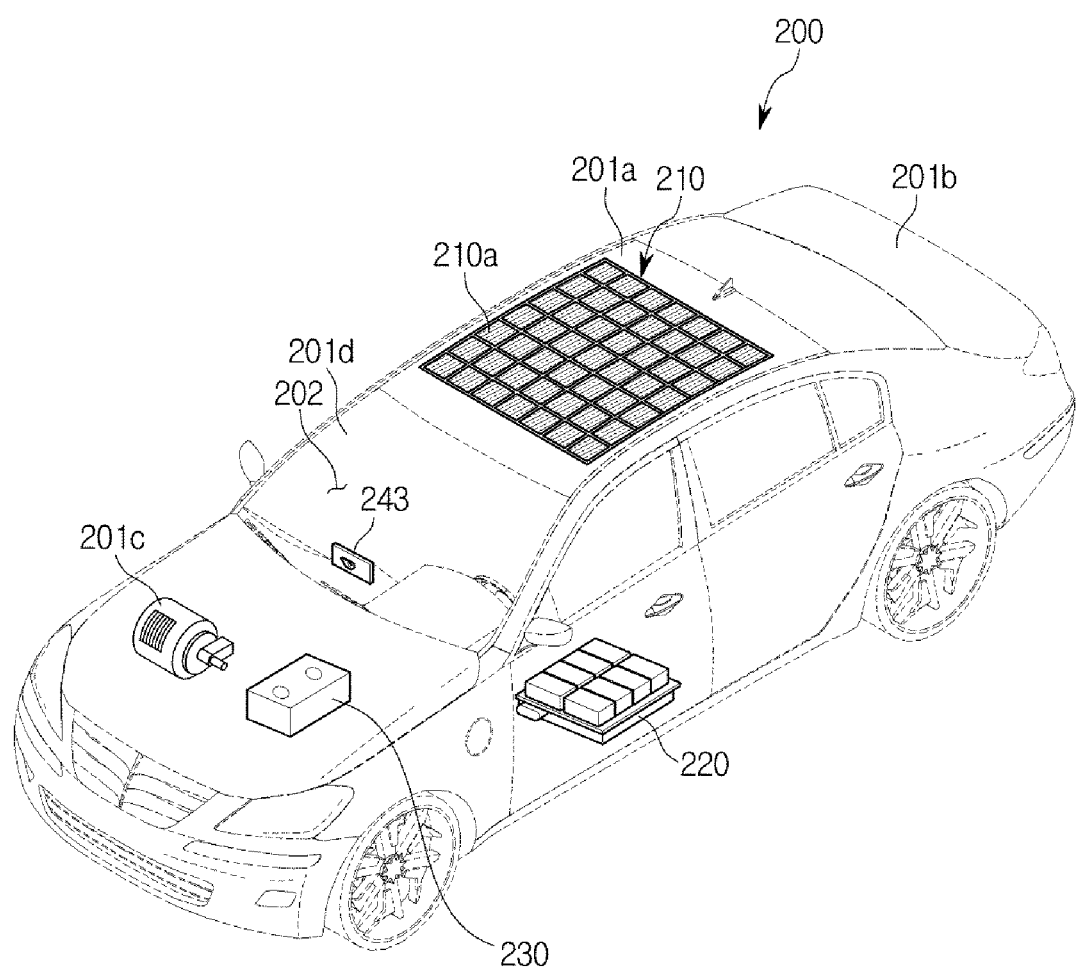
FIG. 7 is an exemplary view illustrating the appearance of a vehicle according to an exemplary embodiment of the present disclosure.
Figure 8:
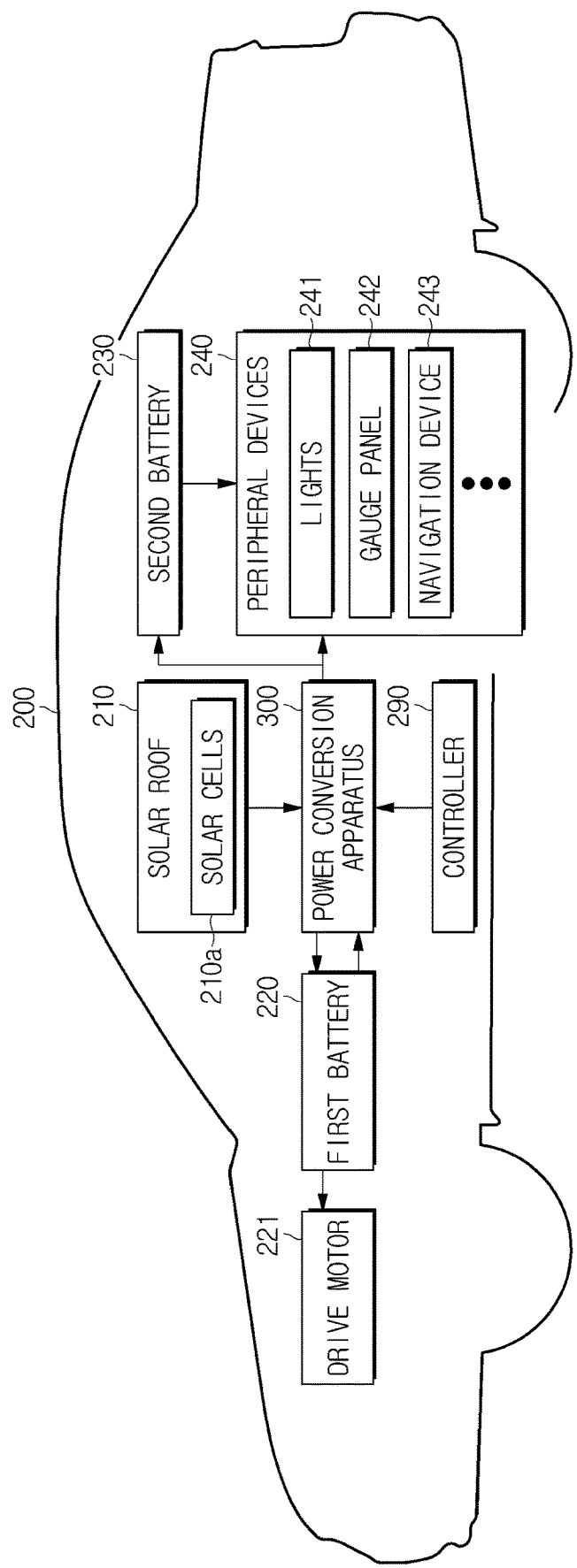
FIG. 8 is an exemplary block diagram illustrating an example of the vehicle according to an exemplary embodiment of the present disclosure.

A vehicle including the power conversion apparatus according to an exemplary embodiment of the present disclosure will hereinafter be described with reference to FIGS. 7 to 12. FIG. 7 is an exemplary view illustrating the appearance of a vehicle according to an exemplary embodiment of the present disclosure. FIG. 8 is an exemplary block diagram illustrating an example of the vehicle.

Referring to FIGS. 7 and 8, the vehicle 200 may include a body 201 forming the appearance of the vehicle 200, an interior cavity 202 partitioned from an exterior by the body 201, a solar power generator 210 mounted to all or a portion of the body 201 to generate electric energy upon receiving sunlight, a drive motor 221 disposed at a position of the interior space 201 to convert electric energy into power energy, a first battery 220 configured to store electric energy and supply the stored electric energy to the drive motor 221, a second battery 230 configured to supply electric energy to at least one peripheral device 240, a peripheral device 240 provided for user convenience or user safety, a controller 290 configured to adjust various operations of the vehicle 200 and a power conversion apparatus 300 configured to control charging of the first battery 220 and/or the second battery 230. The body 201 may have various shapes according to categories of the vehicle 200. The body 201 may include a roof 201a, a trunk lid 201b and an engine hood 201c.

The interior cavity 202 may be provided for a vehicle driver and/or passenger to ride in the vehicle, and may include a seat region including at least one driver seat and/or passenger seat(s). The seat region may be separated from an engine component by a dashboard. For example, the engine compartment may include various components, for example, an engine and/or a drive motor 221, etc. The seat region may include various peripheral devices 240, for example, interior lights 241, a gauge panel 242 or a navigation device 243.

The solar power generator 210 may refer to a device capable of acquiring electric energy using incident sunlight. The solar power generator 210 may include one or more solar cells 210a, each of which is capable of converting solar energy into electric energy. For example, at least one solar cell 210a may be arranged in a matrix. In accordance with an exemplary embodiment, the solar power generator 210 may be dispose don all or a portion of the roof 201a of the body 201 as shown in FIG. 7. The solar power generator 210 may also be disposed on at least one of the trunk lid 201b and the engine hood 201c as necessary. Additionally, the solar power generator 210 may be disposed on each of the roof 201a, the trunk lid 201b and the engine hood 201c. In particular, the solar power generator 210 may be disposed on all or some of the roof 201a, the trunk lid 201b and the engine hood 201c. The output power of each solar cell 210a may be applied to the power conversion apparatus 300.

The first battery 220 may be chargeable at least once and may be configured to supply power to electronic components each requesting a relatively high capacity. For example, the first battery 220 may be configured to supply power to the drive motor 221 configured to output power energy to wheels of the vehicle 200 to enable operation of the vehicle 200. The first battery 220 may be charged with power supplied from the solar power generator 210. In accordance with an exemplary embodiment, the first battery 220 may be charged with power supplied from another power source (e.g., normal power-supply) instead of the solar power generator 210.

In accordance with an embodiment, the power conversion apparatus 300 may be disposed between the solar power generator 210 and the first battery 220. Accordingly, the output power of the solar power generator 210 may be converted by the power conversion apparatus 300 and may then be applied to the first battery 220. Additionally, power of the first battery 220 may be converted by the power conversion apparatus 300, and may then be supplied to the second battery 230. In accordance with an exemplary embodiment, the power conversion apparatus 300 may be embedded within the vehicle 200 and may be disposed between a device (e.g., a power supply terminal equipped with an external power cable to receive power from the power cable) corresponding to another power source other than the solar power generator 210 and the first battery 220.

The first battery 220 may have a relatively higher voltage than the second battery 230. The second battery 230 may be chargeable at least once, and may be configured to supply power to electronic components requesting a relatively low capacity. For example, the second battery 230 may be configured to supply necessary power to the peripheral devices 240 disposed in the interior cavity of the vehicle 200, for example, the lights 241, the gauge panel 242, and/or the navigation device 243, etc.

Although FIG. 8 illustrates the lights 241, the gauge panel 242, and the navigation device 243 as examples of the navigation devices 240 for convenience of description, the scope of the present disclosure is not limited thereto, the navigation devices 240 may include at least one of an air-conditioner, a radio device, headlights, taillights, a communication module, and/or various electronic components to be controlled by electric energy.

As described above, the second battery 230 may have a relatively lower voltage than the first battery 220. Although each of the first battery 220 and the second battery 230 may be implemented using, for example, a lead battery for convenience of description, the scope of the present disclosure is not limited thereto.

The controller 290 may be configured to transmit a control signal to various types of electronic components (e.g., the power conversion apparatus 300, the drive motor 221, and/or the peripheral devices 240) disposed in the interior cavity of the vehicle 200, and may be configured to operate the electronic components. For example, the controller 290 may be implemented using an electronic control unit (ECU) or the like. The ECU or the like may be installed at arbitrary positions of the interior cavity 202 of the vehicle 200. For example, the ECU or the like may be installed at a board mounted to the spacing between the engine compartment and the dashboard, such that the ECU or the like may be disposed in the interior cavity 202 of the vehicle 202.

The power conversion apparatus 300 may be configured to execute charging of at least one of the first battery 220 and the second battery 230 according to predefined setting or a control signal of the controller 290. The power conversion apparatus 300 may be implemented using the power conversion apparatus 100 shown in FIGS. 1A to 6. For example, the output power of the solar cell 210a may be transmitted to the first battery 220, or may be simultaneously transmitted to the first battery 220 and the second battery 230. The power conversion apparatus 300 may be configured to transmit power supplied from the first battery 220 to the second battery 230 and/or the peripheral devices 240. In particular, the power conversion apparatus 300 may be configured to selectively change maximum power capacity, and may be configured to simultaneously transmit power supplied from the first battery 220 to the second battery 230 and/or the peripheral device 240.

Figure 9:
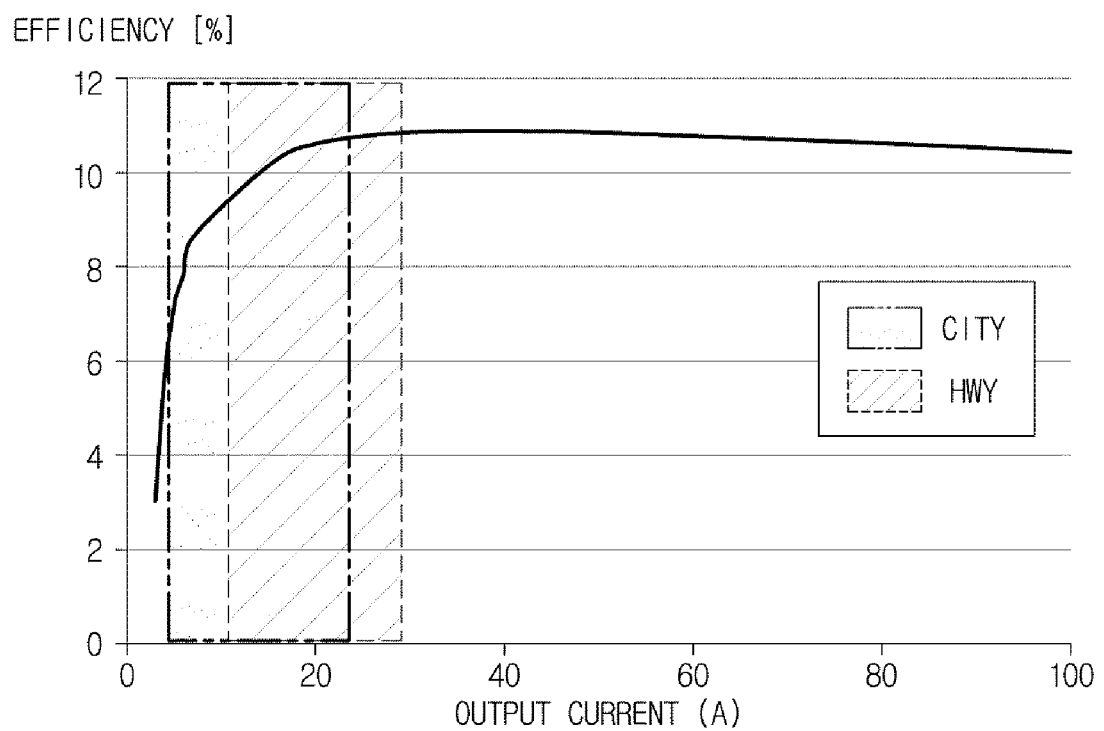
FIG. 9 is an exemplary graph that illustrates the relationship between the output current and the efficiency for each load when one 1.8 kW LDC (Low voltage DC-DC Converter) is used according to the related art.
Figure 10:
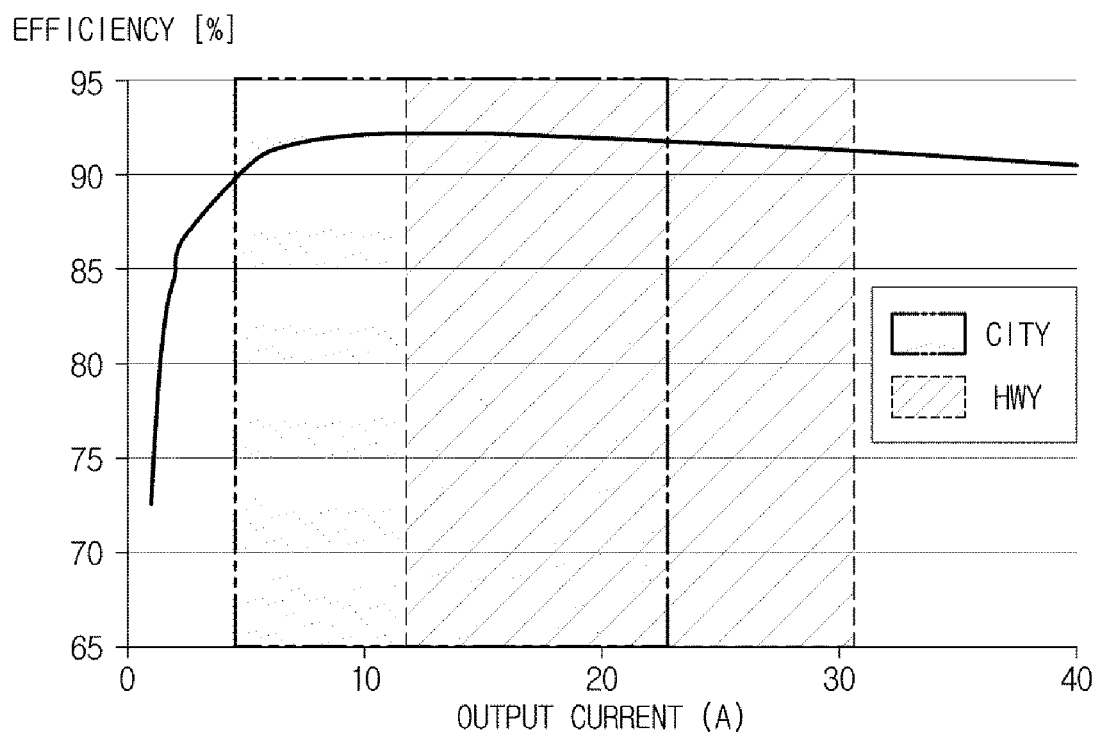
FIG. 10 is an exemplary graph that illustrates the relationship between the output current and the efficiency for each load when the first power conversion portion having 0.8 kW is used according to an exemplary embodiment of the present disclosure.
Figure 11:
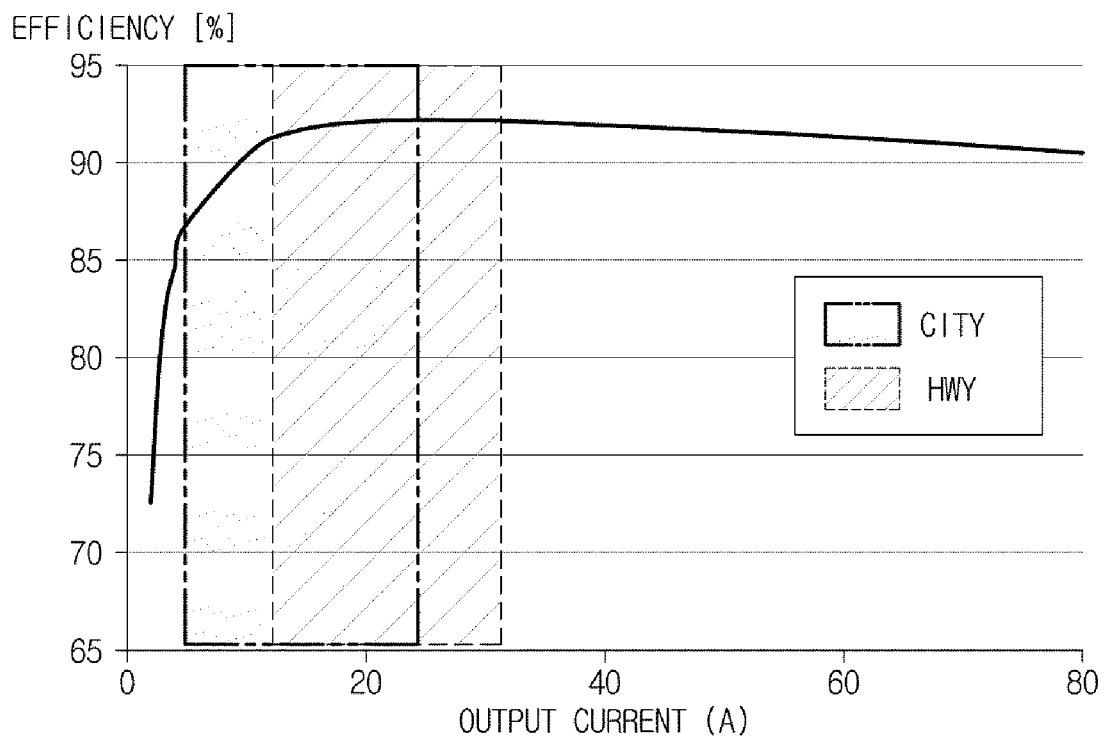
FIG. 11 is an exemplary graph illustrating the relationship between the output current and the efficiency for each load when the second power conversion portion having 1.2 kW is used according to an exemplary embodiment of the present disclosure.

The power conversion apparatus 300 may include the first power conversion portion 110 and the second power conversion portion 150 as shown in FIG. 1A. A method for determining maximum power capacity of the first power conversion portion 110 and maximum power capacity of the second power conversion portion 150 in the vehicle 200 will hereinafter be given. FIG. 9 is an exemplary graph illustrating the relationship between the output current and the efficiency for each load when one 1.8 kW LDC (low voltage DC-DC Converter) is used according to the related art. FIG. 10 is an exemplary graph illustrating the relationship between the output current and the efficiency for each load when the first power conversion portion having 0.8 kW is used. FIG. 11 is an exemplary graph illustrating the relationship between the output current and the efficiency for each load when the second power conversion portion having 1.2 kW is used.

In particular, FIG. 11 shows the efficiency for each load with respect to the output current in one example in which a 0.6 kW LDC is used as the first power conversion portion of the power conversion apparatus 300 and a 1.8 kW LDC is used as the second power conversion portion of the power conversion apparatus 300. The exemplary graphs of FIGS. 9 to 11 illustrate the relationship between the output current (A) and the efficiency for each load. In FIGS. 9 to 11, a non-hatched block refers to a load region mainly used when the vehicle travels in a downtown region (CITY) and a hatched region refers to a load region mainly used when the vehicle travels on a highway (HWY). In association with the above-mentioned examples including a first example in which the vehicle travels in the downtown region (CITY) and a second example in which the vehicle travels on the highway (HWY), some of various devices or components embedded in the vehicle 200 have different frequencies of use and a load region used in the first case may be different from a load region used in the second case.

Referring to FIG. 9, when one 1.8 kW LDC is used according to the related art, the power use efficiency gradually increases until the output current (A) reaches about 20 A, and then arrives at maximum efficiency in the vicinity of about 40 A. However, the load region mainly used when the vehicle travels in the downtown (e.g., a CITY or congested area) is in the range from about 5 A to about 25 A, and the load region mainly used when the vehicle travels on the highway (HWY) is in the range from about 10 A to about 30 A, such that the power use efficiency in downtown traveling of the vehicle or the power use efficiency in highway traveling of the vehicle is unavoidably lower than maximum efficiency.

Further, assuming that the first power conversion portion 110 is driven as shown in FIG. 4, the power use efficiency gradually increases until the output current (A) reaches about 10 A as shown in FIG. 10, and then arrives at maximum efficiency in the vicinity of about 15 A. The load region mainly used when the vehicle travels in the downtown (CITY) may be in the range from about 5 A to about 25 A, and the load region mainly used when the vehicle travels on the highway (HWY) may be in the range from about 10 A to about 30 A. In other words, the output current having maximum efficiency is in the range of the load region mainly used in downtown traveling of the vehicle, and also in the range of the load region mainly used in highway traveling of the vehicle. Therefore, the efficiency in downtown traveling and the efficiency in highway traveling may be substantially identical or similar to the maximum efficiency (about 93%).

When the second power conversion portion 150 is driven as shown in FIG. 5, the efficiency may gradually increase until the output current (A) reaches about 15 A and reaches maximum efficiency in the vicinity of about 25 A as shown in FIG. 11. The load region mainly used when the vehicle travels in the downtown (CITY) may be in the range from about 5 A to about 25 A, and the load region mainly used when the vehicle travels on the highway (HWY) may be in the range from about 10 A to about 30 A. The output current having maximum efficiency may be in the range of the load region mainly used in downtown traveling of the vehicle, but may also be in the range of the load region mainly used in highway traveling of the vehicle.

Therefore, the efficiency in downtown traveling and the efficiency in highway traveling may be substantially identical or similar to the maximum efficiency (e.g., about 93%). Therefore, at least one of the first power conversion portion 110 and the second power conversion portion 150 may be operated according to requested load or charging capacity, to maximize the power use efficiency of the vehicle 200, resulting in improvement of the fuel efficiency.

Figure 12:
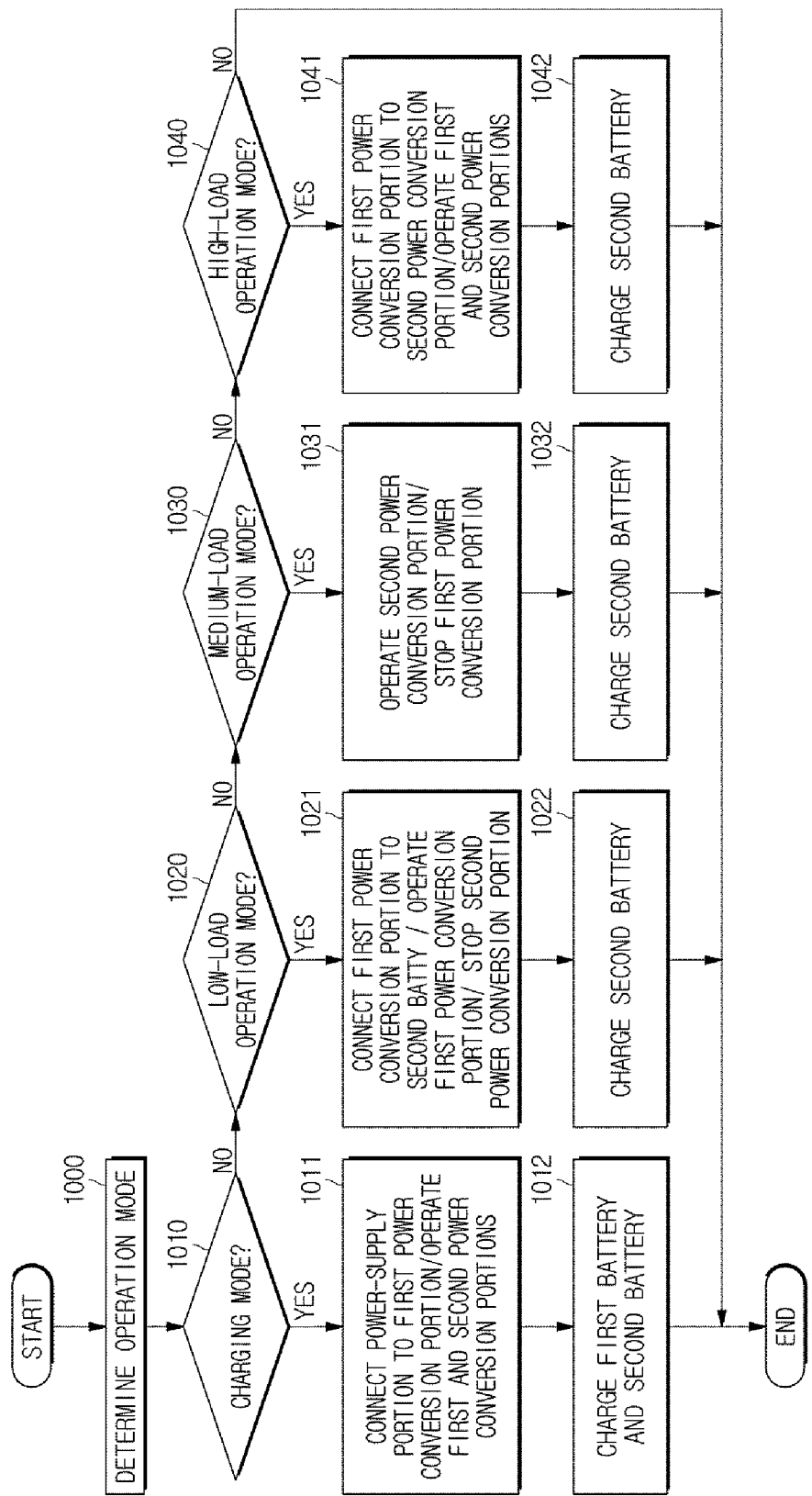
FIG. 12 is an exemplary flowchart illustrating a method for controlling the power conversion apparatus according to an exemplary embodiment of the present disclosure.

A method for controlling the power conversion apparatus according to an exemplary embodiment of the present disclosure will hereinafter be described with reference to FIG. 12. FIG. 12 is an exemplary flowchart illustrating a method for controlling the power conversion apparatus. Referring to FIG. 12, an operation mode of the power conversion apparatus may be determined based on the operation stoppage or requested power capacities of various in-vehicle devices, or the vehicle traveling environment, etc. (Operation 1000). In particular, the operation mode of the vehicle may be determined to be a charging mode (Operation 1010). The charging mode may refer to a series of operations required to charge the battery with power supplied from a power source (e.g., solar cells of the solar power generator).

When the operation mode is determined to be the charging mode, the first end of the first power conversion portion may be connected to the first battery and the second end thereof may be connected to the power-supply portion according to the operation of the switching portion to enable the first power conversion portion to initiate operation (Operation 1011). For example, the operation initiation time of the first power conversion portion may be identical to the connection time between the first power conversion portion and the power-supply portion, or may be determined to be before or after the connection time between the first power conversion portion and the power-supply portion.

The first power conversion portion may be configured to initiate operation as soon as at least one of the first to fourth switch elements included in the first power conversion portion initiates operation. Meanwhile, the first power conversion portion may be configured to perform transformation of the voltage supplied from the power-supply portion according to the operation of the first switch element and the second switch element of the first power conversion portion. Sequentially, the first power conversion portion may be configured to supply power received from the power-supply portion to the first battery, to initiate changing of the first battery (Operation 1012).

When the first power conversion portion starts operation, the second power conversion portion having maximum power capacity different from that of the first power conversion portion may also be configured to initiate operation (Operation 1011). The second power conversion portion may be disposed between the first battery and the second battery. The second power conversion portion may initiate operation when the fifth and sixth switch elements of the second power conversion portion initiate operation.

When the second power conversion portion starts operation, power supplied from the first battery may be applied to the second battery, to also charge the second battery (Operation 1012). When the current mode is not identical to the charging mode, the operation mode of the vehicle may be determined to be a low-load operation mode (Operation 1020). The low-load operation mode may refer to an operation mode in which a relatively smaller amount of load is requested, and may include the second battery charged with relatively lower power.

When the power conversion apparatus operates in the low-load operation mode, the first end of the first power conversion portion is connected to the first battery and the second end thereof is connected to the second battery according to the operation of the switching portion, one power conversion portion (e.g., the first power conversion portion) having a relatively lower maximum power capacity from among the first power conversion portion and the second power conversion may be configured to initiate operation (Operation 1021). In particular, the third switch element and the fourth switch element of the first power conversion portion may be configured operate to convert the voltage applied to the first power conversion portion. In other words, the operation of the second power conversion portion having a relatively higher maximum power capacity may be obstructed (e.g., blocked). The operation of obstructing the second power conversion portion may be executed by obstructing the operations of the first switch element and the sixth switch element.

Power supplied from the first battery may be transferred to the second battery through the first power conversion portion, to charge the second battery when the first power conversion portion starts operation (Operation 1022). In particular, the first battery may not be charged. Additionally, the operation mode of the vehicle may be a medium-load operation mode (Operation 1030). The medium-load operation mode may refer to an operation mode having a relatively larger amount of load (e.g., an increased low when compared to a normal operating condition) is requested as compared to the low-load operation mode, but a relatively smaller amount of load is requested as compared to the high-load operation mode, and may include an exemplary case in which the second battery is charged with a relatively medium amount of power.

During the medium-operation mode, one power conversion portion (e.g., the second power conversion portion) having a relatively higher maximum power capacity from among the first power conversion portion and the second power conversion may initiate the operation (Operation 1031). In other words, the fifth switch element and the sixth switch element of the second power conversion portion may be configured to convert the voltage applied from the first battery to the second power conversion portion. In some exemplary embodiments, the operation of the first power conversion portion having a relatively lower maximum power capacity may be obstructed. The operation for obstructing the first power conversion portion may be executed by obstructing the operations of the first switch element and the second switch element, or by obstructing of the operations of the third switch element and the fourth switch element. Additionally, the operation for obstructing the first power conversion portion may be performed by obstructing of any one of the first and second switch elements and any one of the third and fourth switch elements.

Power may be supplied from the first battery that is applied to the second battery through the second power conversion portion to charge the second battery when the second power conversion portion initiates operation (Operation 1032). In the medium-load operation mode, the first battery may not be charged in the same manner as described above. In particular, the second end of the first power conversion portion may be electrically connected to the second battery or may be electrically connected to the power-supply portion according to selection of the designer.

A controller may be configured to determine that the operation mode of the vehicle is the high-load operation mode (Operation 1040). Then, the first power conversion portion and the second power conversion portion may initiate operation when one end of the first power conversion portion is connected to the first battery and a second end of the first power conversion portion may be connected to the second battery according to the operation of the switching operation (Operation 1041). In other words, the high-load operation mode may refer to an operation mode in which a relatively larger amount of load is requested as compared to the low-load operation mode and the medium-load operation mode or the second battery may be adjusted with a relatively higher power.

In some exemplary embodiments, the third switch element and the fourth switch element of the first power conversion portion may be configured to convert the voltage applied to the first power conversion portion. The fifth switch element and the sixth switch element of the second power conversion portion may be configured to convert the voltage applied to the second power conversion portion. Therefore, power from the first power conversion portion and power from the second power conversion portion may be simultaneously applied to the second battery, to initiate charging of the second battery (Operation 1042).

Although the method for controlling the above-mentioned power conversion apparatus according to exemplary embodiments of the present disclosure has been disclosed centering around an example that includes the second battery charged upon receiving power from the first battery in a low-load operation mode, a medium-load operation mode, and a high-load operation mode, the scope or spirit of the exemplary embodiments is not limited thereto, and the exemplary embodiments may also be applied to other examples in which power is supplied to the external load in the same or similar way to the above example. In other words, the second battery may be replaced with the external load. Additionally, the above-mentioned method for controlling the power conversion apparatus may also be applied to other exemplary embodiments in which power may be simultaneously supplied to both the second battery and the external load, without departing from the scope and spirit of the disclosure as disclosed in the accompanying claims.

As is apparent from the above description, the power conversion apparatus, the method for controlling the same, and the vehicle including the same according to the exemplary embodiments of the present disclosure may reduce the overall size of the power conversion apparatus and may allow the power conversion apparatus to charge a battery with electricity. Further, the power conversion apparatus, the method for controlling the same, and the vehicle including the same according to the exemplary embodiments of the present disclosure may reduce the overall size of the power conversion apparatus and may reduce the overall weight of the vehicle including the power conversion apparatus, resulting in improvement in vehicle fuel efficiency.

Additionally, the power conversion apparatus, the method for controlling the same, and the vehicle including the same according to the exemplary embodiments of the present disclosure may relatively reduce the number of transformers mounted to the power conversion apparatus, resulting in reduction of production costs of the power conversion apparatus. The power conversion apparatus, the method for controlling the same, and the vehicle including the same according to the exemplary embodiments of the present disclosure may allow the power conversion apparatus to be selectively operated according to various situations, to more efficiently operate the power conversion apparatus and improve fuel efficiency of the vehicle including the power conversion apparatus.

Although the exemplary embodiments of the present disclosure have been shown and described, the technical spirit of the present disclosure is not limited to the exemplary embodiments presented in the present specification and those skilled in the art who appreciate the technical spirt of the present disclosure will be able to propose other exemplary embodiments without departing from the principles and spirit of the invention, the scope of which is defined in the claims and their equivalents.

What is claimed is:

1. A power conversion apparatus, comprising:
    a first power conversion portion having a first end connected to a first battery and a second end selectively connected to at least one of a power-supply portion and a second battery;
    a second power conversion portion having a first end connected to the first battery and a second end connected to the second battery, configured to provide power supplied from the first battery to the second battery; and
    a switching portion configured to connect any one of the power-supply portion and the second battery to the first power conversion portion,
    wherein the first power conversion portion and the second power conversion portion simultaneously operate to provide power of the first battery to the second battery when an electrically-connected external load requests a larger amount of power than a predetermined value or the second battery is charged with higher power than a predetermined value.

2. The power conversion apparatus according to claim 1, wherein:
    the first power conversion portion provides power supplied from the power-supply portion to the first battery when the first power conversion portion is connected to the power-supply portion; and
    the first power conversion portion provides power supplied from the first battery to the second battery when the first power conversion portion is connected to the second battery.

3. The power conversion apparatus according to claim 1, wherein:
    the first power conversion portion increases a voltage received from the power-supply portion when the first power conversion portion is connected to the power-supply portion; and
    the first power conversion portion reduces a voltage received from the first battery when the first power conversion portion is connected to the second battery.

4. The power conversion apparatus according to claim 1, wherein the second power conversion portion reduces a voltage received from the first battery.

5. The power conversion apparatus according to claim 1, wherein:
    the first power conversion portion and the second power conversion initiate operation when charging is performed using the power-supply portion, and the first power conversion portion provides power supplied from the power-supply portion to the first battery and the second power conversion portion provides power supplied from the first battery to the second battery.

6. The power conversion apparatus according to claim 1, wherein:
any one of the first power conversion portion and the second power conversion portion is configured to provide power of the first battery to the second battery when an electrically-connected external device is configured to require a smaller amount of power than the predetermined value or the second battery is charged with lower power than the predetermined value.

7. The power conversion apparatus according to claim 6, wherein the first power conversion portion has a maximum power capacity different from the maximum power capacity of the second power conversion portion.

8. The power conversion apparatus according to claim 1, wherein a first switch element and a second switch element are connected in parallel between the first battery and the second battery.

9. The power conversion apparatus according to claim 1, further comprising:
a controller configured to operate at least one of the first power conversion portion, the second power conversion portion, and the switching portion.

10. The power conversion apparatus according to claim 1, wherein the first power conversion portion or the second power conversion portion, or both includes a DC-DC converter which converts a predetermined low level voltage.

11. The power conversion apparatus according to claim 1, wherein the power-supply portion includes a solar power generator configured to output power corresponding to incident sunlight.

12. A method for controlling a power conversion apparatus, comprising:
operating, by a controller a power conversion apparatus; and
charging, by the power conversion apparatus a first battery and a second battery using a power-supply portion;
forming an electrical connection between a first power conversion portion and the power-supply portion;
initiating, by the controller, operation of the first power conversion portion and a second power conversion portion;
configuring, by the controller, the first power conversion portion to provide power supplied from the power-supply portion to the first battery; and
configuring, by the controller, the second power conversion portion to provide power supplied from the first battery to the second battery,
wherein a first end of the first power conversion portion is connected to the first battery and a second end of the first power conversion portion is selectively connected to at least one of the power-supply portion and the second battery according to a control signal,
wherein the second power conversion portion electrically connects the first battery to the second battery, and
wherein forming an electrical connection between the first power conversion portion and the second battery when an electrically-connected external load requires a larger amount of power that a predetermined value or the second battery is charged with higher power than a predetermined value, simultaneously operating the first power conversion portion and the second power conversion portion; and providing power supplied from the first battery to the second battery through both of the first power conversion portion and the second power conversion portion.

13. The method according to claim 12, further comprising:
initiating, by the controller, operation of any one of the first power conversion portion and the second power conversion portion when an electrically-connected external device requires a smaller amount of power than the predetermined value or the second battery is charged with lower power than the predetermined value; and
providing power supplied from the first battery to the second battery through any one of the first power conversion portion and the second power conversion portion.

14. The method according to claim 13, wherein the first power conversion portion has a maximum power capacity different from the maximum power capacity of the second power conversion portion.

15. The method according to claim 13, further comprising:
forming an electrical connection between the first power conversion portion and the second battery.

16. A vehicle, comprising:
a power-supply portion configured to provide power;
a first battery configured to be charged with power supplied from the power-supply portion, and have a relatively high voltage compared to a relatively low voltage;
a second battery configured to be charged with power supplied from the first battery, and have the relatively low voltage compared to the relatively high voltage;
a first power conversion portion, a first end connected to the first battery and a second end selectively connected to at least one of the power-supply portion and the second battery; and
a second power conversion portion having a first end connected to the first battery and a second end connected to the second battery, configured to provide power supplied from the first battery to the second battery, and
wherein the first power conversion portion and the second power conversion portion simultaneously operate to provide power of the first battery to the second battery when an electrically-connected external load requires a larger amount of power than a predetermined value or the second battery is charged with higher power than a predetermined value.

17. The vehicle according to claim 16, wherein:
the first power conversion portion and the second power conversion initiate operation when charging is performed using the power-supply portion, and
wherein the first power conversion portion provides power supplied from the power-supply portion to the first battery and the second power conversion portion provides power supplied from the first battery to the second battery.

18. The vehicle according to claim 16, further comprising:
any one of the first power conversion portion and the second power conversion portion initiate operation and provides power supplied from the first battery to the second battery when an electrically-connected peripheral device requires a smaller amount of power than the predetermined value or the second battery is charged with lower power than the predetermined value.

19. The vehicle according to claim 16, further comprising:
an electrically-connected peripheral device configured to require a relatively larger amount of power than the predetermined value or the second battery is charged with higher power than the predetermined value, wherein the first power conversion portion and the second power conversion portion simultaneously operate and provide power supplied from the first battery to the second battery.

\* \* \* \* \*